(12) United States Patent
Washbrook et al.

(10) Patent No.: US 12,028,344 B2
(45) Date of Patent: *Jul. 2, 2024

(54) ENHANCED LOAD PROCESSING USING LINKED HIERARCHICAL DATA STRUCTURES

(71) Applicant: Live Nation Entertainment, Inc., Beverly Hills, CA (US)

(72) Inventors: Jonathan Washbrook, West Hollywood, CA (US); Brooke Breyfogle, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,403

(22) Filed: Dec. 20, 2022

(65) Prior Publication Data

US 2023/0122726 A1 Apr. 20, 2023

Related U.S. Application Data

(63) Continuation of application No. 16/826,546, filed on Mar. 23, 2020, now Pat. No. 11,539,702, which is a continuation of application No. 15/830,464, filed on Dec. 4, 2017, now Pat. No. 10,601,833, which is a continuation of application No. 15/489,224, filed on
(Continued)

(51) Int. Cl.
| | | |
|---|---|---|
| *H04L 29/06* | (2006.01) | |
| *H04L 9/40* | (2022.01) | |
| *H04L 47/70* | (2022.01) | |
| *H04L 49/20* | (2022.01) | |
| *H04L 49/35* | (2022.01) | |
| *H04L 67/1001* | (2022.01) | |

(Continued)

(52) U.S. Cl.
CPC .............. *H04L 63/10* (2013.01); *H04L 47/70* (2013.01); *H04L 49/20* (2013.01); *H04L 49/35* (2013.01); *H04L 63/107* (2013.01); *H04L 67/1001* (2022.05); *H04L 67/1012* (2013.01); *H04L 67/1097* (2013.01); *H04L 63/08* (2013.01)

(58) Field of Classification Search
CPC ......... H04L 63/10; H04L 47/70; H04L 49/20; H04L 49/35; H04L 63/107; H04L 67/1002; H04L 67/1012; H04L 67/1097; H04L 63/08; G06F 21/62; G06F 21/6218
See application file for complete search history.

(56) References Cited

U.S. PATENT DOCUMENTS

| | | | |
|---|---|---|---|
| 9,870,431 B2 * | 1/2018 | Hammen | G06F 16/9024 |
| 2004/0088340 A1 * | 5/2004 | Idicula | G06F 21/629 |

(Continued)

*Primary Examiner* — Malcolm Cribbs
(74) *Attorney, Agent, or Firm* — MUGHAL GAUDRY & FRANKLIN PC

(57) ABSTRACT

The present disclosure relates to enhancing load processing for facilitated assignment or modification of access-right data. More specifically, the present disclosure relates to enhancing load processing and data storage using hierarchical data structures that can store various iterations of resource objects. In some embodiments, a computer-implemented method, system, and/or computer-program product tangibly embodied in a non-transitory machine-readable storage medium for enhanced load processing using hierarchical data structures may be provided.

20 Claims, 17 Drawing Sheets

Related U.S. Application Data

Apr. 17, 2017, now Pat. No. 9,838,395, which is a continuation of application No. 15/185,731, filed on Jun. 17, 2016, now Pat. No. 9,628,555.

(60) Provisional application No. 62/181,532, filed on Jun. 18, 2015.

(51) Int. Cl.
  *H04L 67/1012* (2022.01)
  *H04L 67/1097* (2022.01)

(56) References Cited

U.S. PATENT DOCUMENTS

| | | | |
|---|---|---|---|
| 2006/0200668 A1* | 9/2006 | Hybre | G06F 21/575 |
| | | | 713/168 |
| 2011/0258683 A1* | 10/2011 | Cicchitto | G06F 21/604 |
| | | | 726/4 |
| 2013/0198400 A1* | 8/2013 | Bhogal | H04L 69/18 |
| | | | 709/230 |
| 2014/0136648 A1* | 5/2014 | Hemmi | G06F 3/0659 |
| | | | 709/216 |
| 2015/0189017 A1* | 7/2015 | Amidei | H04L 67/5681 |
| | | | 709/217 |
| 2016/0359761 A1* | 12/2016 | Sussman | G06Q 30/0283 |

\* cited by examiner

ENHANCED LOAD PROCESSING USING LINKED HIERARCHICAL DATA STRUCTURES

CROSS REFERENCE TO RELATED APPLICATIONS

The present application is a continuation of U.S. application Ser. No. 16/826,546, filed Mar. 23, 2020, which is a continuation of U.S. application Ser. No. 15/830,464, filed Dec. 4, 2017, now U.S. Pat. No. 10,601,833, issued Mar. 24, 2020, which is a continuation of U.S. application Ser. No. 15/489,224 filed Apr. 17, 2017, now U.S. Pat. No. 9,838,395, issued Dec. 5, 2017, which is a continuation of U.S. application Ser. No. 15/185,731, filed Jun. 17, 2016, now U.S. Pat. No. 9,628,555, issued Apr. 18, 2017, which claims the priority benefit of U.S. Provisional Application No. 62/181,532, filed Jun. 18, 2015, the disclosures of each of which are hereby incorporated by reference in their entirety for all purposes.

TECHNICAL FIELD

The present disclosure generally relates to enhancing load processing for facilitated assignment of access-right data. More specifically, the present disclosure relates to enhancing load processing and data storage techniques using linked hierarchical data structures that can store various iterations of resources.

BACKGROUND

Various data-storage techniques can be inefficient. Often, storage devices redundantly store data. Such redundant storage of data can reduce load processing performance metrics, such as latency, load balancing, and throughput. As a result, access, retrieval, or modification of inefficiently stored data by remote systems may be unnecessarily burdensome.

SUMMARY

In some embodiments, a computer-implemented method for enhanced load processing using hierarchical data structures is provided. A plurality of protocols associated with a resource can be at least partly client defined. For example, each of the plurality of protocols can be at least partly defined by an input received from a client device. The resource can correspond to a plurality of access rights for allocation to various user devices. Resource data associated with the resource can be stored in a hierarchical data structure. For example, the resource data can include a set of iterations of the resource, and each iteration of the set of iterations can correspond to a different time associated with availability of the resource. Each iteration can correspond to a leaf node of the hierarchical data structure. Further, each iteration can be linked to one or more protocols stored in a protocol data store. A first communication can be received from the client device. The first communication can include request data representing a request to define a link between an iteration of the set of iterations and a protocol of the plurality of protocols. In response to receiving the communication, the protocol data store can be queried for the plurality of protocols associated with the resource. A response can be received from the protocol data store. For example, the response can include an indication of each of the protocols of the plurality of protocols. Presentation of the indication of each of the protocols can be facilitated at the client device. A second communication can be received from the client device. For example, the second communication can include a selection of one or more protocols of the plurality of protocols. For each of the selected protocols, a link can be defined for the iteration. For example, defining a link for an iteration can include selecting one or more protocols from the plurality of protocols. An identifier (e.g., a pointer) for each of the one or more selected protocols can be determined and stored in the iteration (e.g., in the leaf node corresponding to the iteration). For example, the identifier of each of the one or more selected protocols can be separately stored in the iteration. A result can be generated based on the defined one or more links for the iteration.

In some embodiments, a primary load management system for enhanced load processing using hierarchical data structures is provided. The primary load management system includes one or more network interfaces configured to establish connections to one or more networks. The primary load management system further includes one or more data processors coupled to the one or more network interfaces to process communications received at the one or more network interfaces. Further, the primary load management system include can include a protocol data store to store a plurality of protocols associated with a resource, and a hierarchical data structure that stores a set of iterations of the resource. The hierarchical data structure can be linked to the protocol data store. For example, pointers stored in the hierarchical data structure can point to locations in the protocol data store. The primary load management system also includes a non-transitory computer-readable storage medium containing instructions which when executed on the one or more processors, cause the one or more processors to perform one or more actions of one or more methods disclosed herein.

In some embodiments, a computer-program product tangibly embodied in a non-transitory machine-readable storage medium is provided. The computer-program product includes instructions configured to cause one or more data processors to perform actions of one or more methods disclosed herein.

BRIEF DESCRIPTION OF THE DRAWINGS

The specification makes reference to the following appended figures, in which use of like reference numerals in different figures is intended to illustrate like or analogous components.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
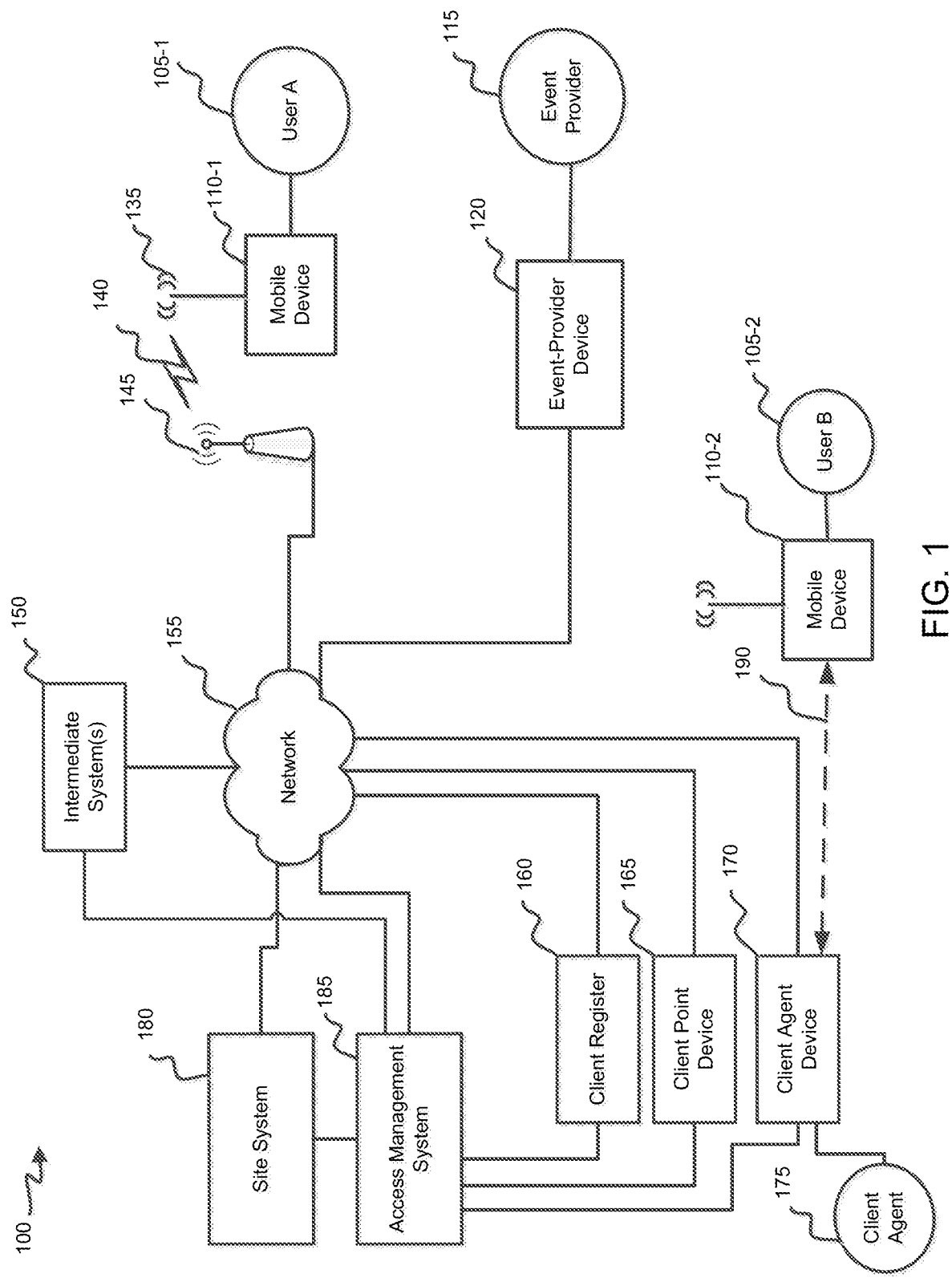
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

In some instances, access management system 185 can be associated with or can include a primary load management system (e.g., primary load management system 1014 as described herein). In some instances, access management system 185 can facilitate enhanced load processing using linked hierarchical data structures. For example, access management system 185 can store a hierarchical data structure having a plurality of leaf nodes (e.g., corresponding to iterations of a resource). Further, leaf nodes can store pointers to storage locations of a protocol data store, which stores a plurality of protocols associated with a resource or resources. Access management system 185 can enable a client device to define which pointers are stored in the leaf nodes of the hierarchical data structure. Access management system 185 can also generate a result using the one or more pointers stored in a particular leaf node. For example, a result can include a plurality of allocation parameters, such that an allocation parameter corresponds to an access right to a resource. For example, an allocation parameter can correspond to a condition that a user device must satisfy before the access right can be allocated to the user device. Access rights can facilitate a user's entry to a spatial area associated with the resource.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175

(e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
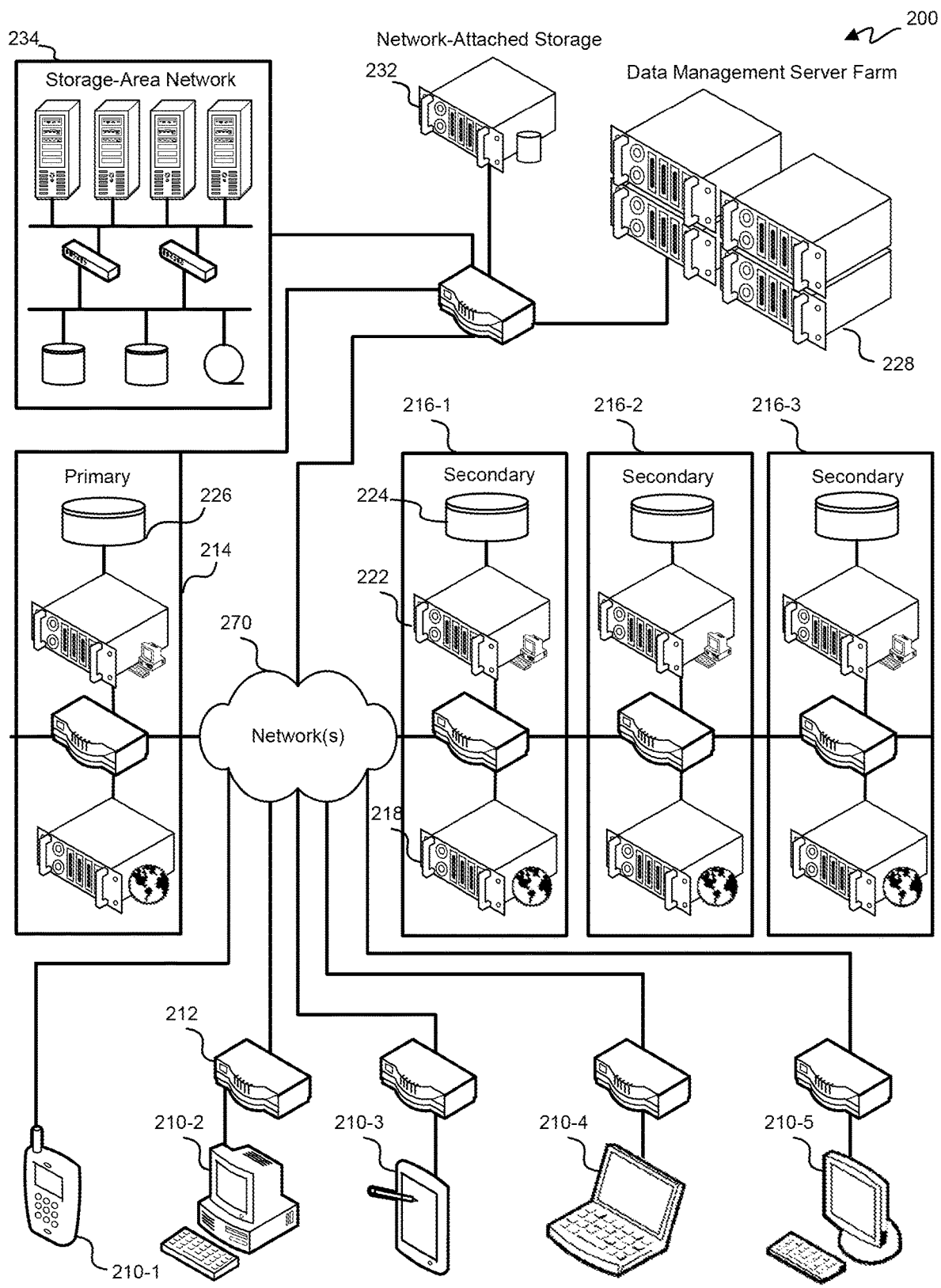
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
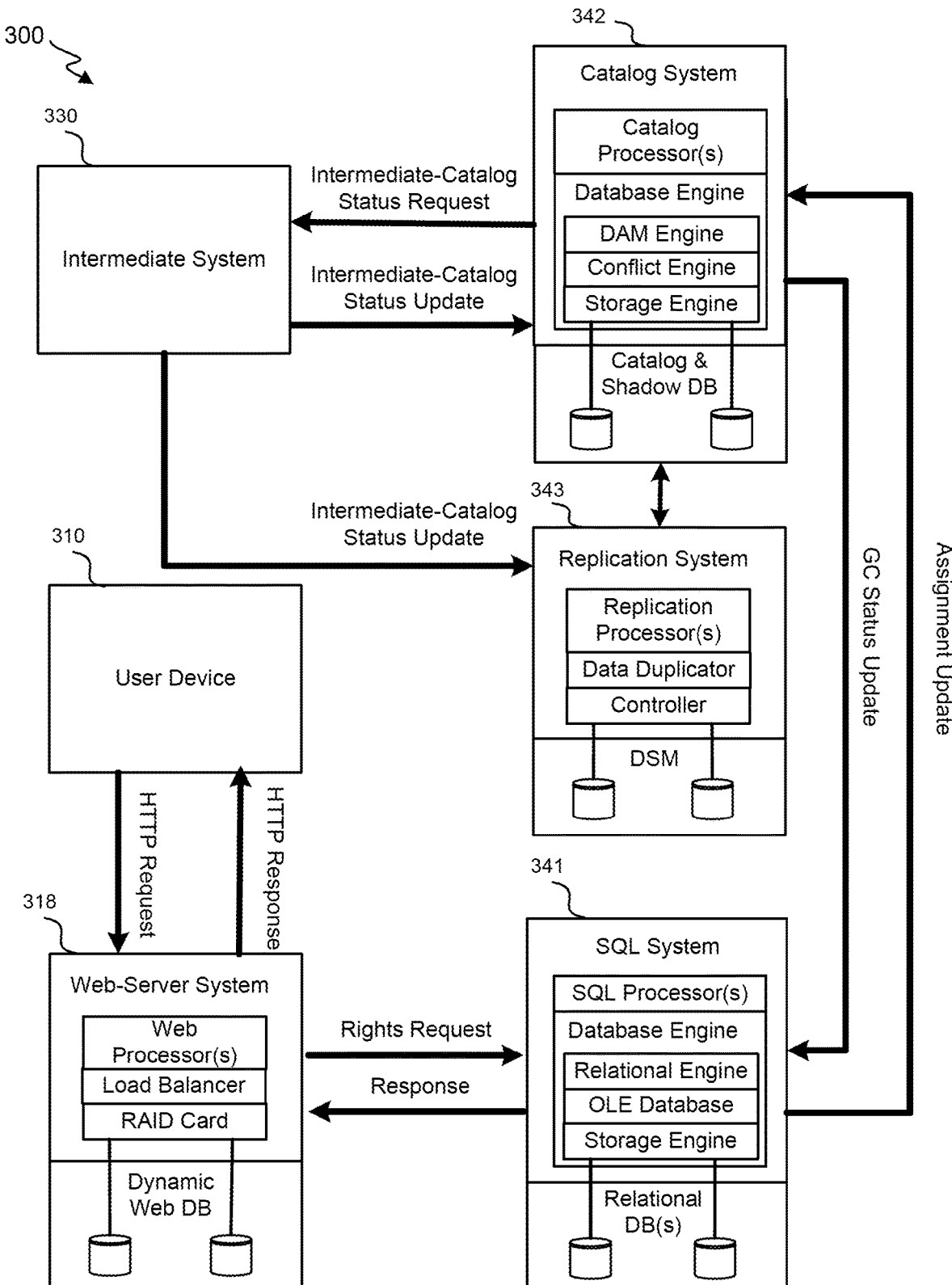
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
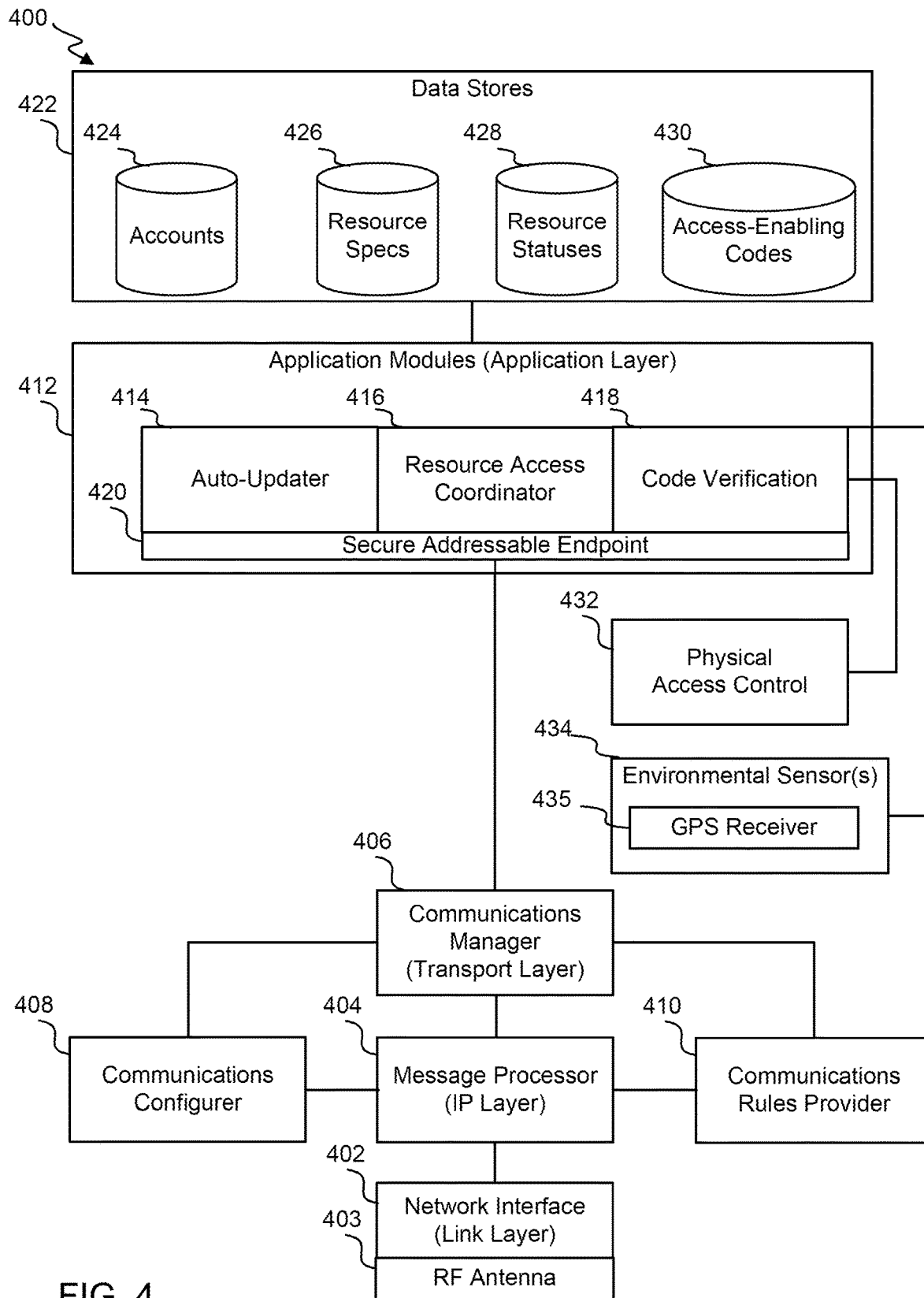
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment-related data (e.g., account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
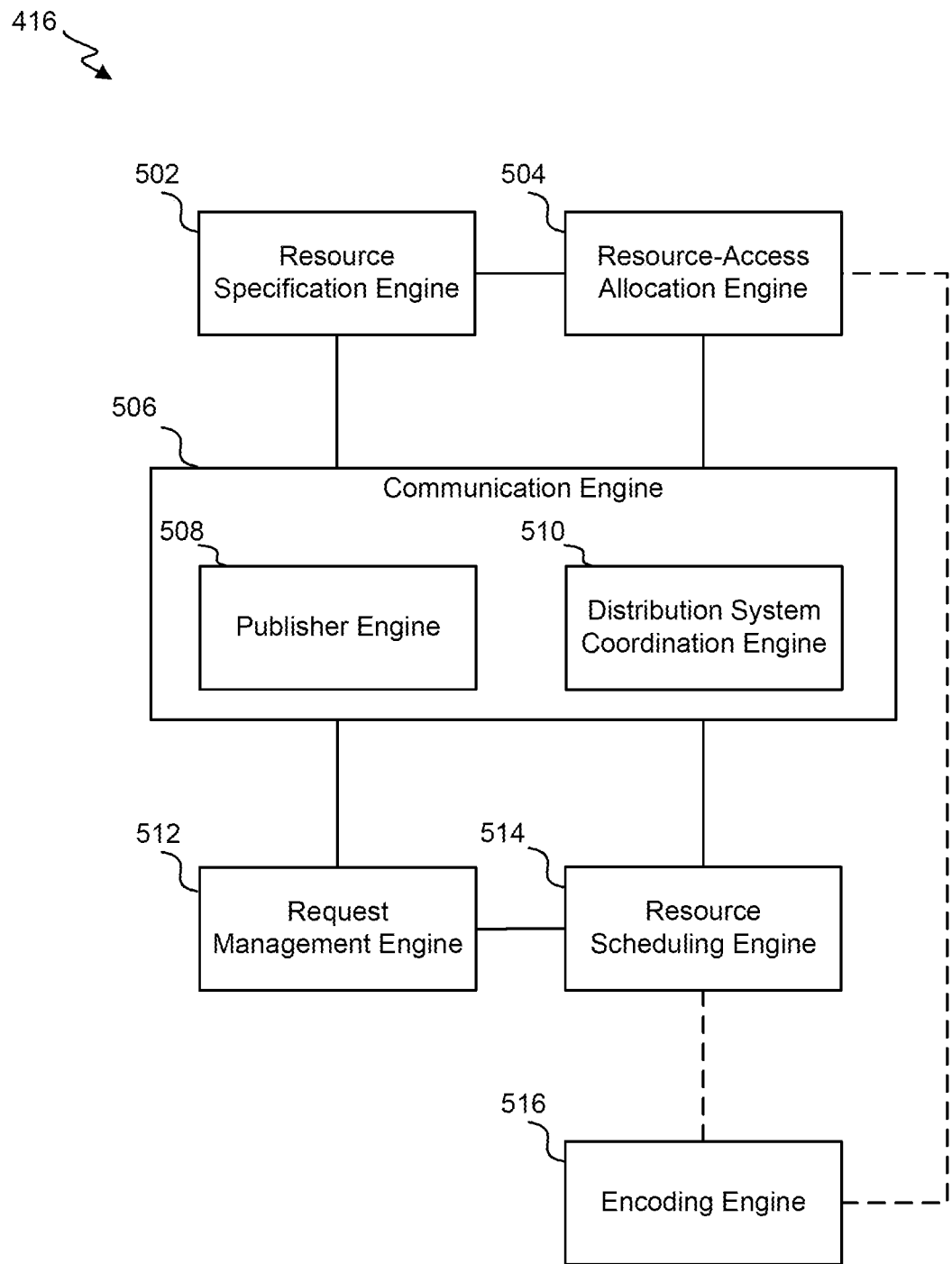
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial area) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on authorization thereof, an allocated access right can be initially unassociated with particular entities (e.g., users). For example, an allocated right can correspond to one or more access characteristics, such as an processor identifier, a usage time, a memory allocation, and/or a geographic location (e.g., section or seat identifier). For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect allocation information (e.g., payment information), determine that allocation information has been received, obtain authorization of allocation, determine that allocation has been authorized (e.g., via an intermediate system), collect the allocation information, and/or determine that allocation information has been collected. For example, publisher engine 508 may receive an allocation information via a webpage, and request management engine 512 can request authorization for an amount of the requested access rights. In some instances, allocation assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or allocation information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining authorization for allocation and/or user confirmation) and/or to change a status of the access right(s) to indicate that they have been assigned (e.g., immediately, upon receiving authorization for allocation or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being available at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
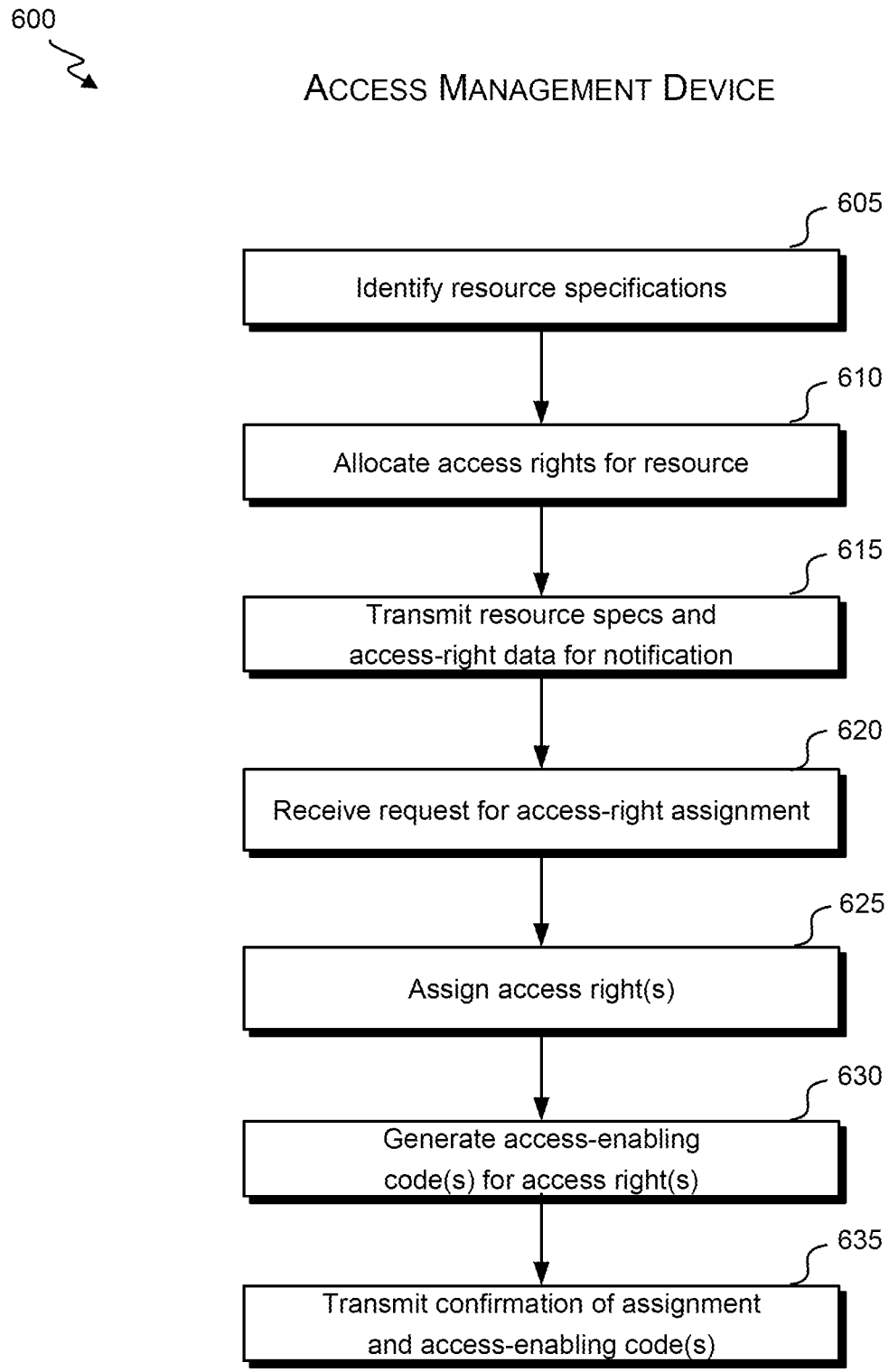
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether allocation information for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, one or more provisions and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease providing the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
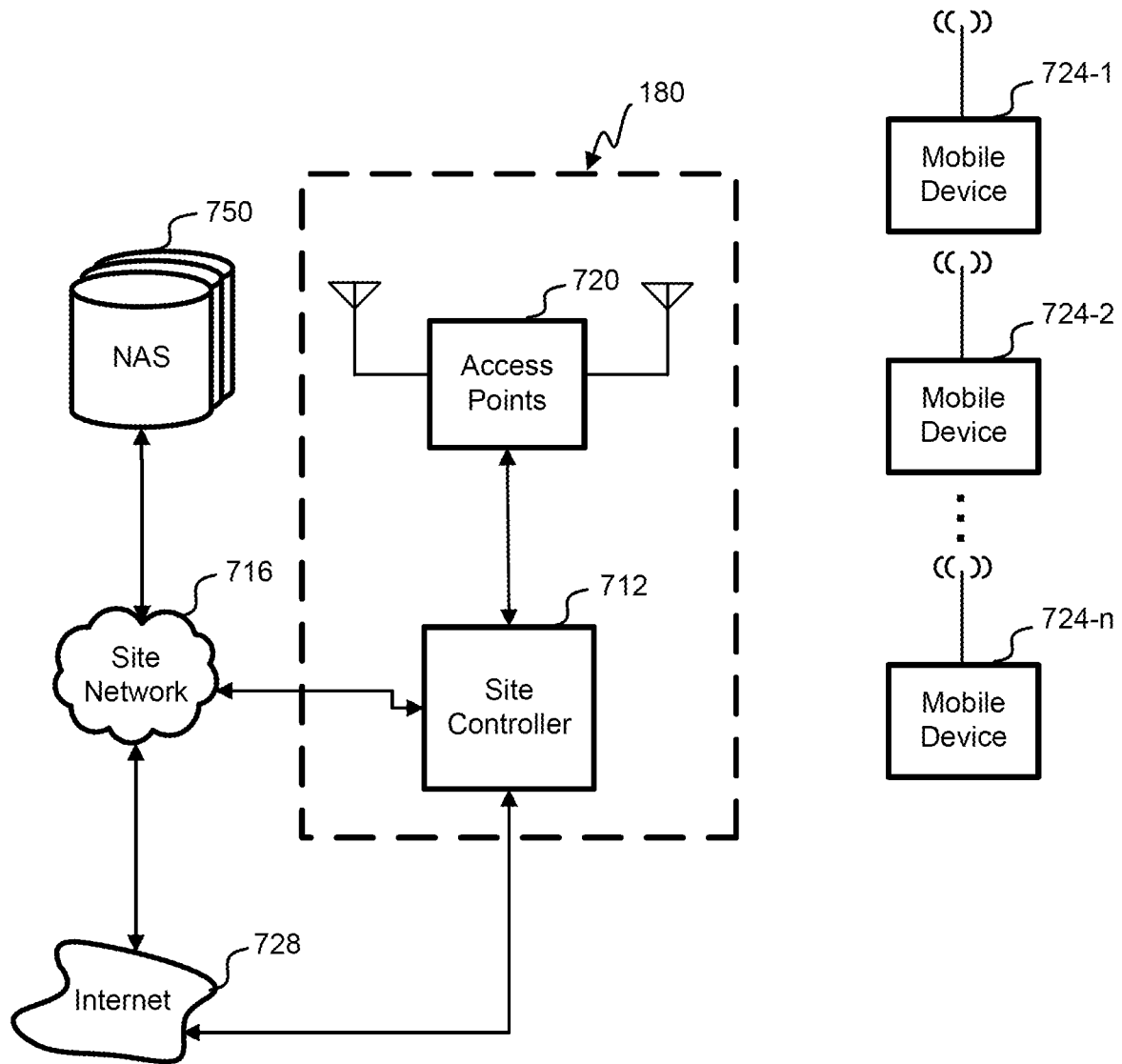
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
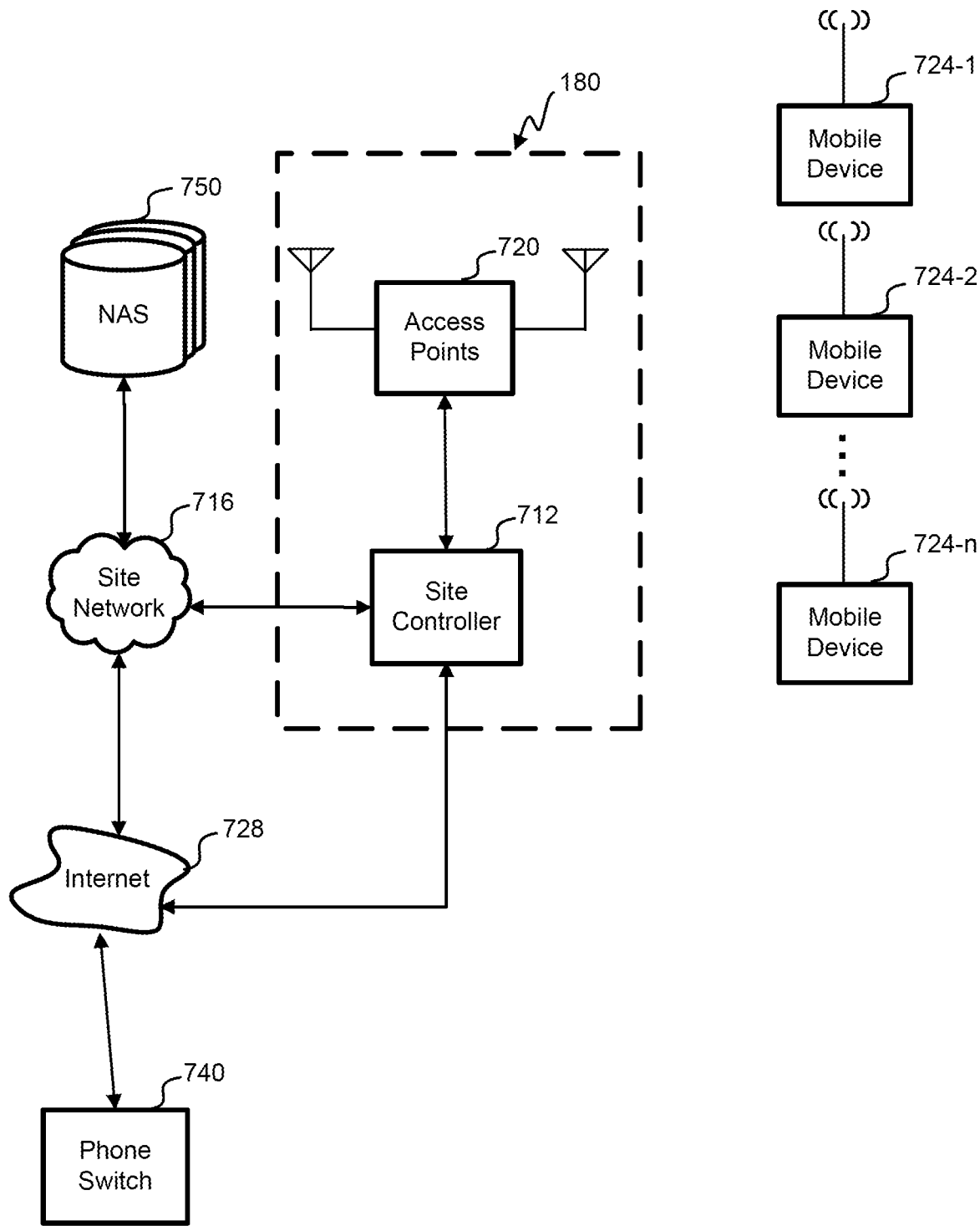

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
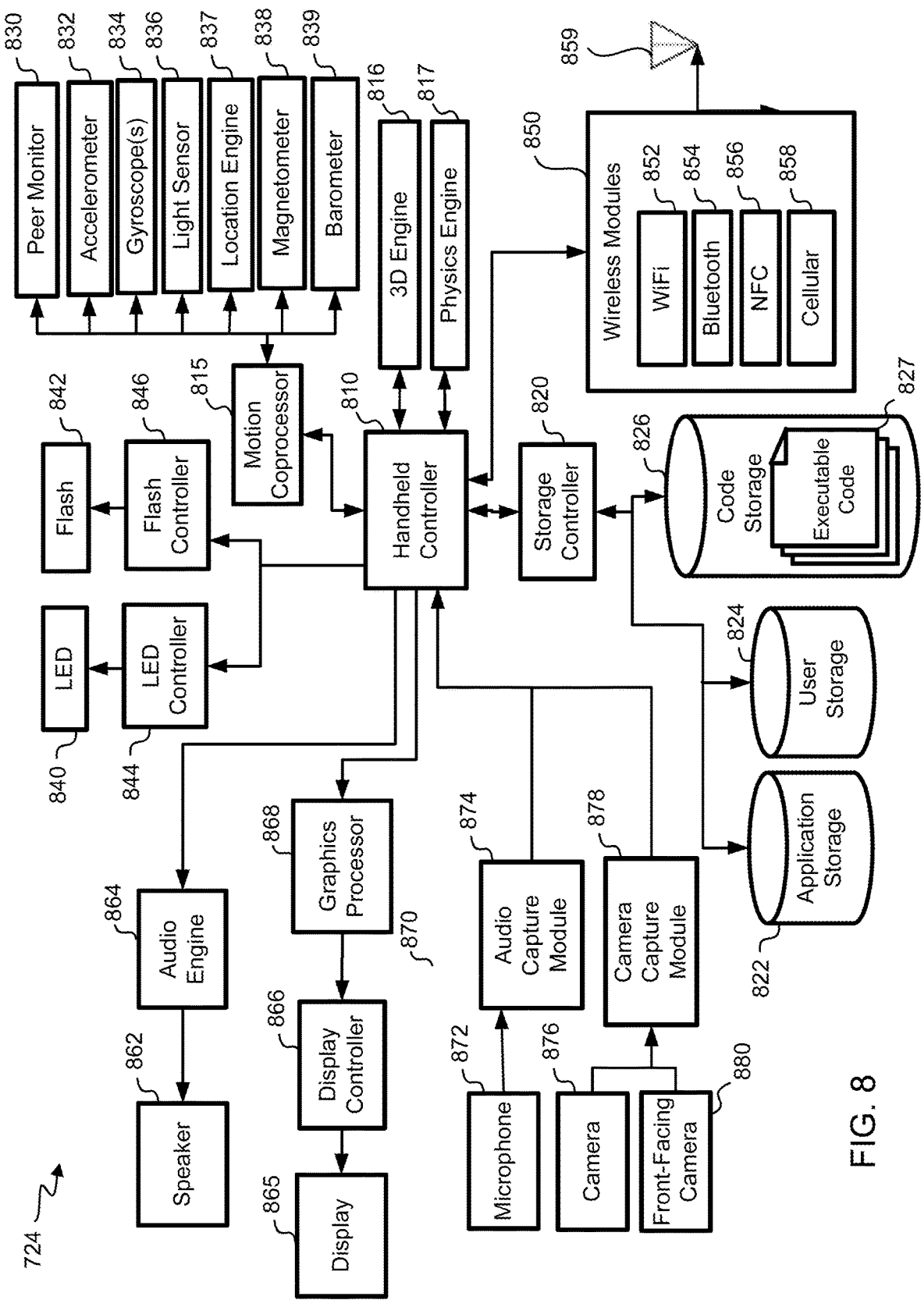
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
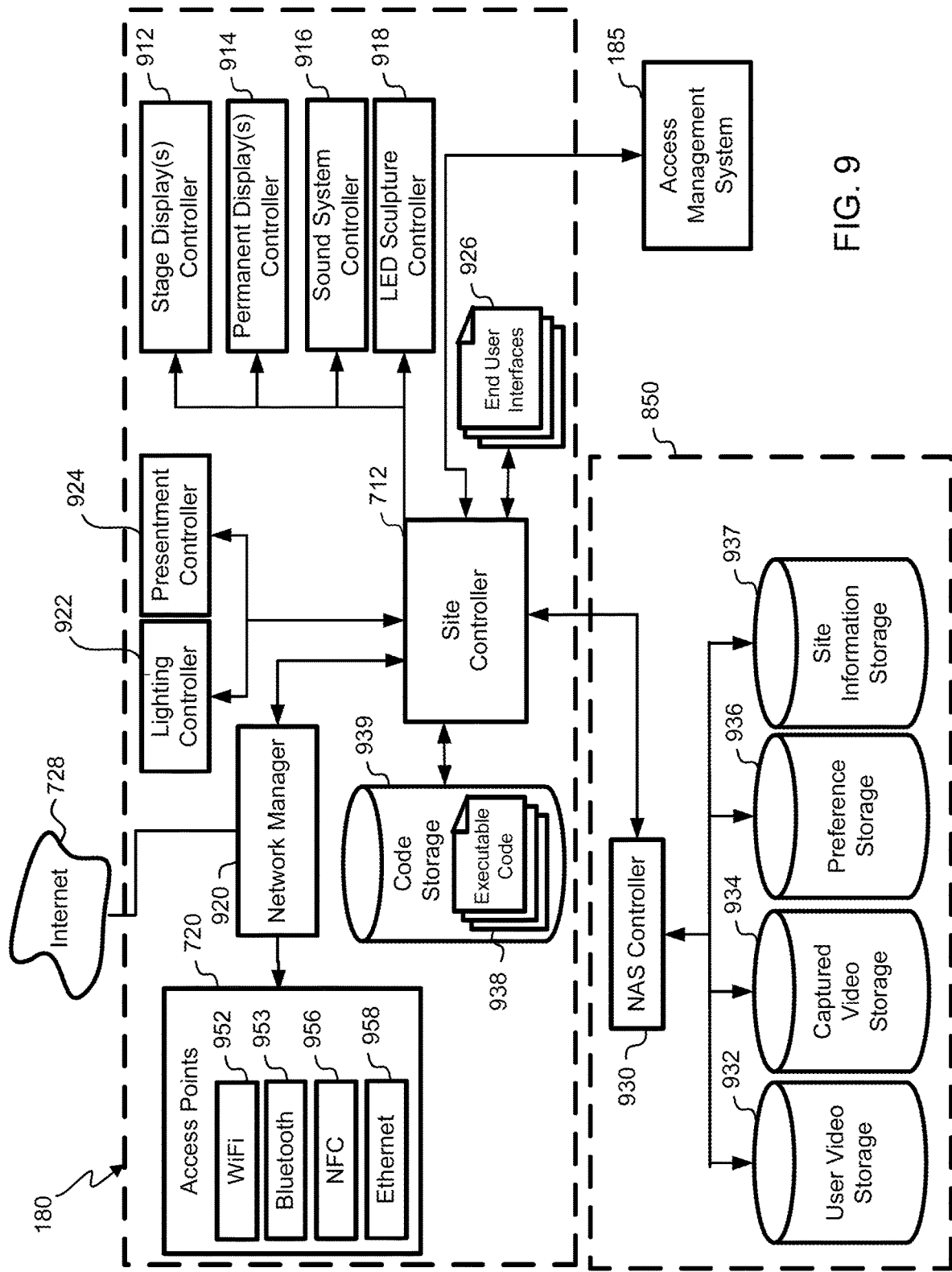
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event location. A broad variety of event location features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the event location sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may provide quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10A:
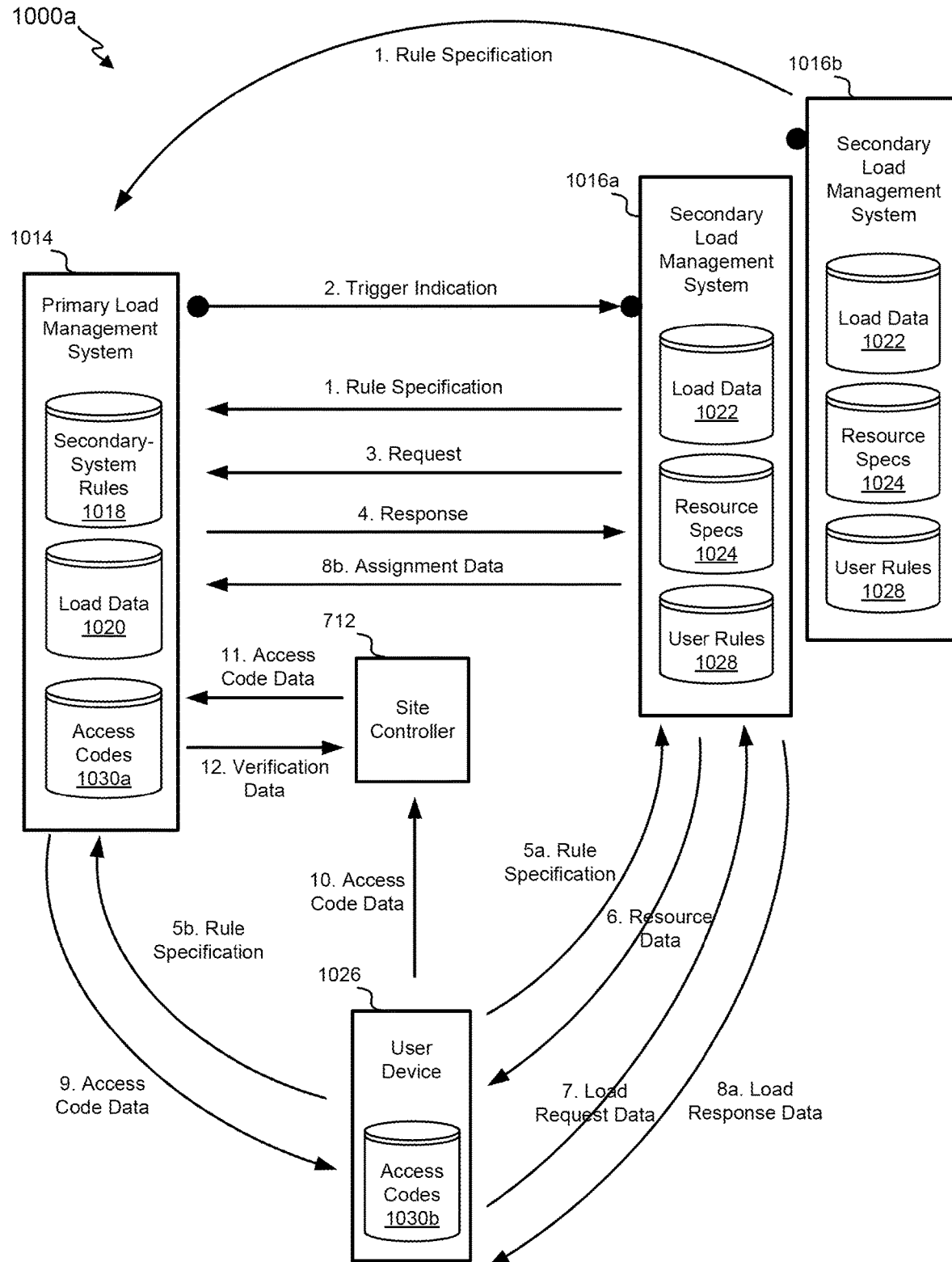
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIGS. 10A-B may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested (e.g., and provided allocation information for) one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a desired load (e.g., corresponding to a number of access-right slots, such as seats). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a time period. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to enable facilitated distribution to users upon allocation of access-right slots to a secondary load management system. Early provision of allocation parameters by a secondary load management system can enable such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization (e.g., weather forecast) corresponding to a resource, a throughput monitor (e.g., identifying a probability of a performing entity in being positioned in a playoff or other game) and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location, one or more performing entities and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in a webpage hosted, controlled and/or managed by secondary load management system 1016a, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming allocation information. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, account, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030*b*. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000*a* can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000*a* are contemplated. For example, in one instance, secondary load management system 1016*a* may at least partly manage access codes. For example, one or more access codes corresponding to a load may be transmitted from primary load management system 1014 to secondary load management system 1016*a* as part of a response. Secondary load management system 1016*a* may then transmit select access codes to a user device 1026, and (in various instances) either primary load management system 1014 or secondary load management system 1016*a* may provide verification of the code to site controller 712.

Figure 10B:
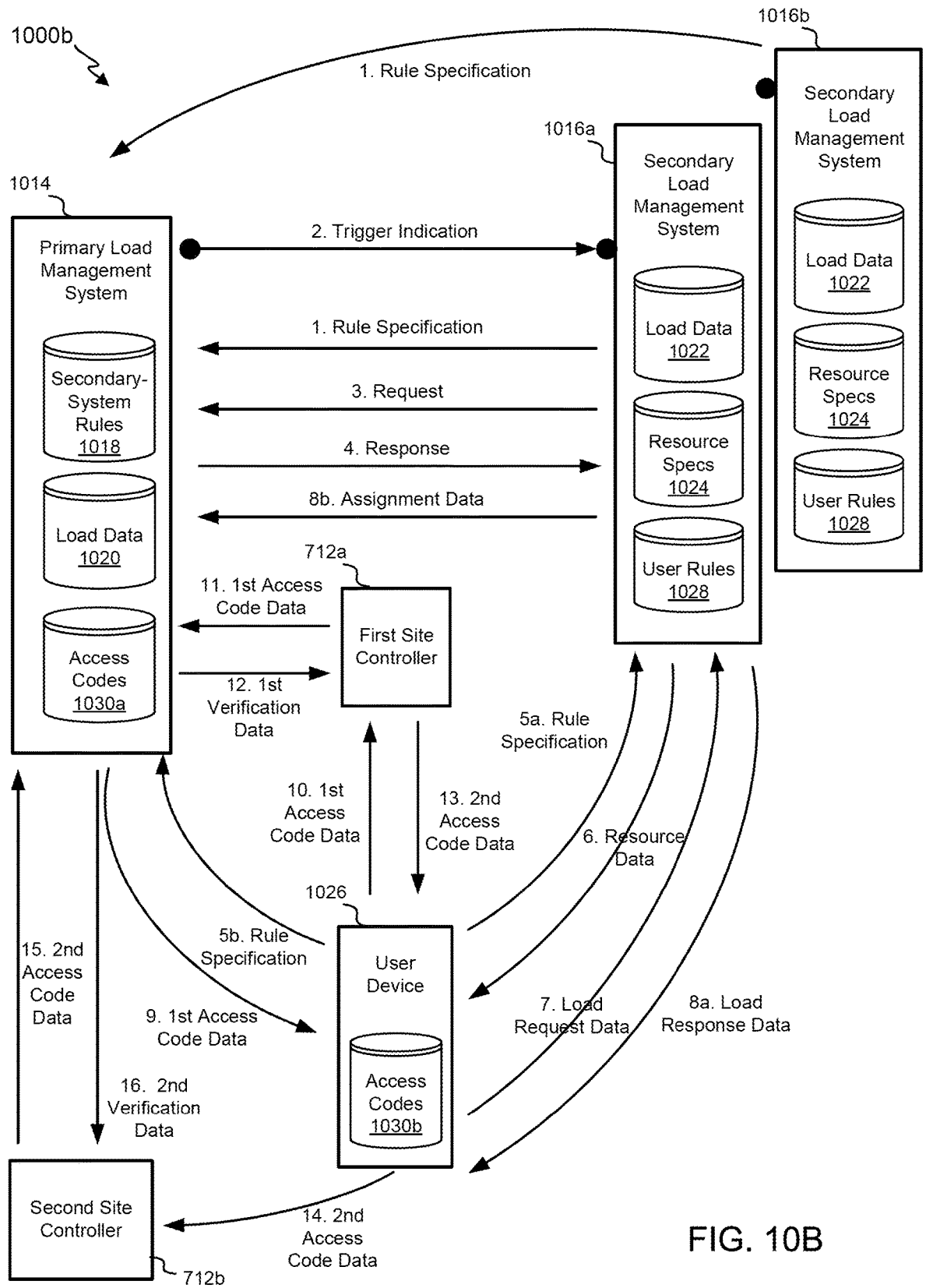

Referring next to FIG. 10B, another example of a communication exchange 1000*b* involving primary load management system 1014 and each of a plurality of secondary load management systems 1016*a*, 1016*b* is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712*a*.

First site controller 712*a* may communicate with primary load management system 1014 to verify the data, in a manner similar to that described herein. Upon detecting that the first access code data has been verified, first site controller 712*a* can transmit second access code data to user device 1026. The second access code data have a precision of association that associates the data with one or more particular access characteristics (e.g., one or more seats). The second access code data may be, for example, generated at first site controller 712*a* or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712*b* is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712*b*. Second site controller 712*b* can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712*a*) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712*b*, for example, in response to communications from one or more other site controllers and/or primary load management system 1014 that identify second access code data that have been issued.

Figure 11:
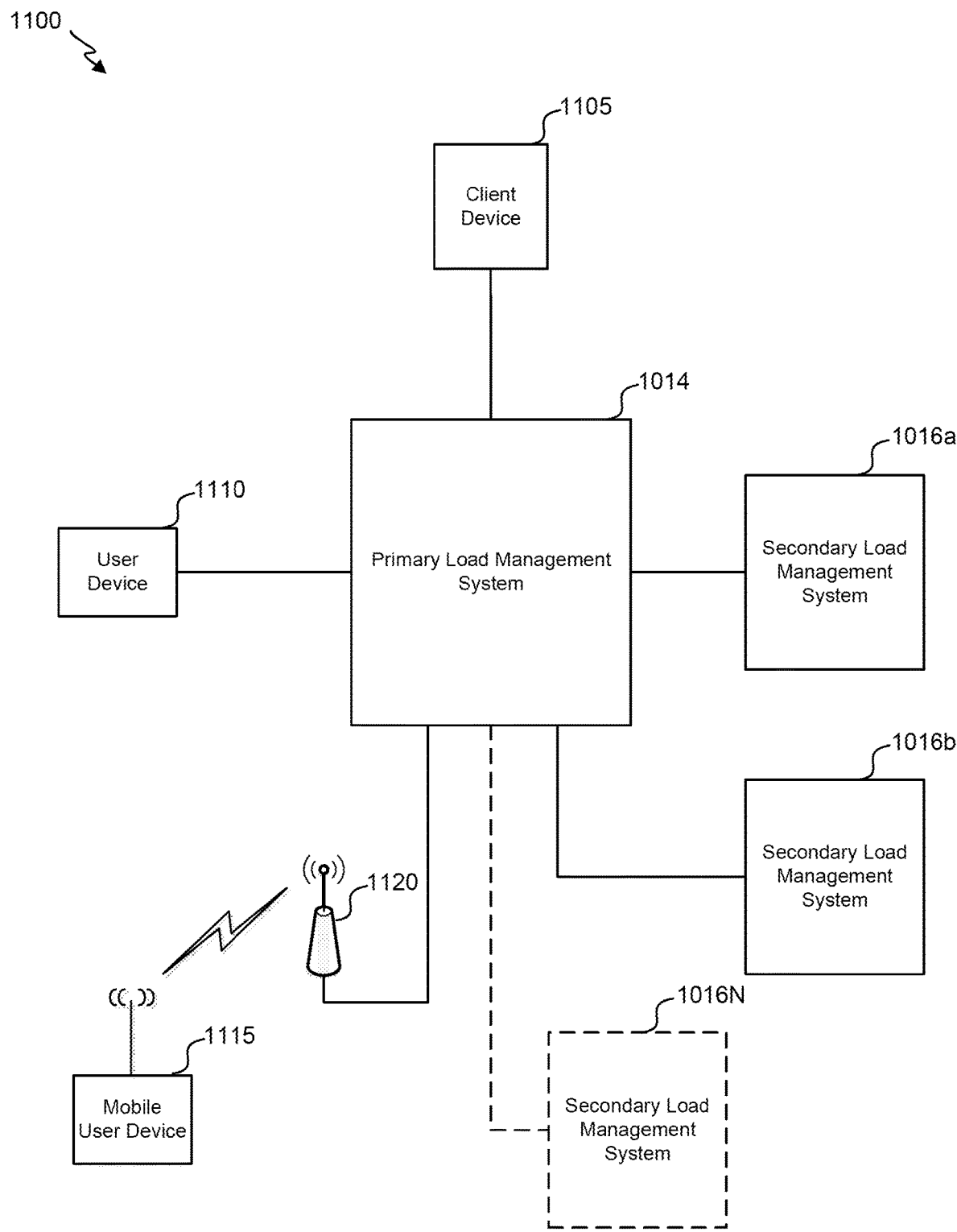
FIG. 11 illustrates a block diagram of another embodiment of a resource access-facilitating interaction system.

FIG. 11 illustrates a block diagram of an embodiment of resource access-facilitating interaction system 1100. Resource access-facilitating interaction system 1100 can include primary load management system 1014, secondary load management systems 1016*a* through 1016*n*, client device 1105, user device 1110, mobile user device 1115, and access point 1120. Client device 1105, user device 1110, and mobile user device 1115 can be a type of end user device. Examples of end user devices can include smartphones, mobile phones, tablets, desktops, laptops, and/or other similar devices. For example, client device 1105 can be associated with an entity operating a venue, and user device 1110 and mobile user device 1115 can be associated with various users (e.g., user A 105-1, user B 105-2, or other users). In the example illustrated in FIG. 11, user device 1110 can be a non-portable computing device (e.g., a desktop computer), and mobile user device 1115 can be a portable computing device (e.g., a smartphone).

In some instances, resource access-facilitating interaction system 1100 can facilitate the allocation of access rights associated with a resource. For example, client device 1105, which can be operated by an agent of the entity, can access primary load management system 1014 to generate various parameters associated with allocation of the access rights associated with the resource. Parameters can include one or more conditions, which when satisfied, facilitate the allocation of access rights to user devices. Examples of a condition can include a price to be paid by a user, a selection to be made by the user, an availability of access right or resource, and other suitable conditions. In some instances, generating parameters to be used for allocating access rights can include generating a spatial model having a plurality of positions. Each position can correspond to an access right. Evaluating the spatial model can include generating an output using a relationship model (described further herein) for each position included in the spatial model. The output for a particular position in the spatial model can correspond to a parameter, which needs to be satisfied, before the corresponding access right can be allocated (e.g., to a user device or to a secondary load management system).

For example, client device 1105 can transmit a communication to primary load management system 1014. The communication can include a request to set parameters for access rights associated with a resource. Primary load management system 1014 can execute various authentication techniques to verify that client device 1105 or the agent operating client device 1105 is authorized. Upon verifying the authorization of client device 1105, primary load management system 1014 can provide client device 1105 with access to access-right data representing the plurality of access rights associated with the resource.

User device 1110, mobile user device 1115, and secondary load management systems 1016*a* through 1016*n* can individually query primary load management system 1014 to request allocation of access rights. Upon receiving the queries, primary load management system 1014 can automatically determine whether or not to allocate the access rights. For example, mobile user device 1115 can transmit a communication to primary load management system 1014 via access point 1120 (e.g., a Wi-Fi access point). The communication can include request data representing a request to allocate an access right to mobile user device 1115. For example, request data can be data included in the communication (e.g., data identifying a user associated with the communication) or can be data associated with the communication (e.g., a timestamp of receiving the communication at primary load management system 1014). Allocating an access right to mobile user device 1115 can include facilitating access for mobile user device 1115 to the resource.

Primary load management system 1014 can retrieve the parameters (e.g., allocation parameters) associated with the access right to determine whether the request data satisfies the allocation parameters. If primary load management system 1014 determines that the request data satisfies the allocation parameters, then the access right is allocated to mobile user device 1115. In this case, mobile user device can access the resource using the allocated access right. If primary load management system 1014 determines that the request data does not satisfy the allocation parameters, then the access right is not allocated to mobile user device 1115.

In some instances, secondary load management systems 1016*a* through 1016*n* can also individually transmit communications to primary load management system 1014. For example, secondary load management system 1016*a* can query primary load management system 1014 for allocation of one or more access rights to a resource. Allocating an access right to secondary load management system 1016*a* enables secondary load management system 1016*a* to then re-allocate the access right to one or more user devices. For example, secondary load management system 1016*a* can transmit a communication to primary load management system 1014. The communication can include request data representing a request to allocate one or more access rights to secondary load management system 1016*a*. Upon receiving the request data, primary load management system 1014 can retrieve the parameters associated with the requested one or more access rights to determine whether the parameters are satisfied. In some instances, allocation parameters for the same access right can be different for secondary load management systems than for user devices. If primary load management system 1014 determines that the request data satisfies the allocation parameters, then the access right is allocated to secondary load management system 1016*a*. In this case, secondary load management system 1016*a* can generate a new set of allocation parameters for re-allocating the access right to various users. Secondary load management system 1016*a* can also use the same set of parameters used by primary load management system 1014. If primary load management system 1014 determines that the request data does not satisfy the allocation parameters, then the access right is not allocated to secondary load management system 1016*a*.

Figure 12:
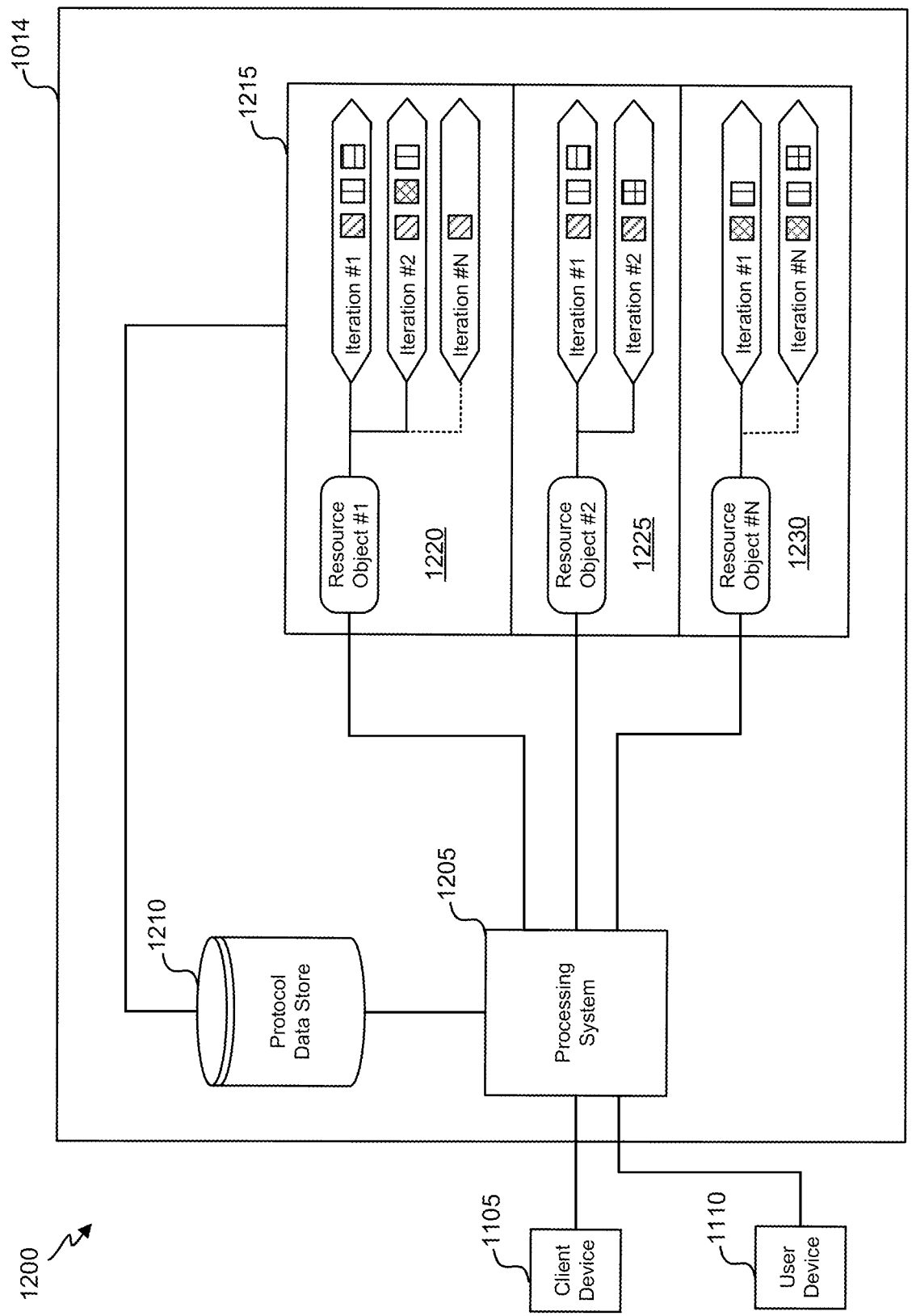
FIG. 12 illustrates a block diagram of yet another embodiment of a resource access-facilitating interaction system.

FIG. 12 illustrates a block diagram of another embodiment of resource access-facilitating interaction system 1200. In some instances, resource access-facilitating interaction system 1200 can facilitate the determination of allocation parameters for allocating access rights associated with a resource. In other instances, resource access-facilitating interaction system 1200 can facilitate the modification of protocols for determining the allocation parameters.

In some instances, resource access-facilitating interaction system 1200 can include client device 1105, user device 1110, and primary load management system 1014. Primary load management system 1014 can include processing system 1205, protocol data store 1210, and hierarchical data structure 1215. Processing system 1205 can include one or more processing devices (e.g., a processor) for processing communications received at the processing system 1205. Processing communications can include various operations, such as routing, transforming, modifying, amplifying, translating, calculating, or any other suitable operation.

Protocol data store 1210 can store a plurality of protocols for determining allocation parameters. For example, a protocol can include a workflow, decision tree, or series of operations for determining an allocation parameter of an access right. In some instances, an allocation parameter can include one or more conditions (e.g., a price) for determining whether to allocate an access right to a user device, secondary load management system, or other suitable device. Further, protocol data store 1210 can store protocols that are common to various resources, common among iterations of a particular resource (discussed later herein), specific to a particular resource, specific to a particular iteration of a resource, and other suitable protocols. Upon satisfaction of the one or more conditions by a user device, for example, processing system 1205 can facilitate the allocation of the access right to the user device. For example, allocation of an access right to a user device facilitates entry to a spatial area associated with the resource.

Data structure 1215 can store a plurality of hierarchical data structures 1220, 1225, and 1230. Each hierarchical data structure can uniquely correspond to a particular resource. For example, each of hierarchical data structures 1220 to 1230 can store a resource object that represents a resource. A resource object can include resource data that represents various information about the resource. For example, resource object #1 stored in hierarchical data structure 1220 can include resource data that represents additional details of a first resource; resource object #2 stored in hierarchical data structure 1220 can include resource data that represents additional details of a second resource; resource object #N stored in hierarchical data structure 1220 can include resource data that represents additional details of an Nth resource; and so on. Resource data can include a geographical location associated with the resource, one or more client's associated with the resource, one or more client devices authorized to modify the resource data, a performing entity, a number of access rights (e.g., seats) available, information specific to iterations (e.g., the pointers stored, identifiers of pointers stored, defined links, identifiers of defined links, and so on), and other suitable data. Further, each hierarchical data structure can include a plurality of levels (e.g., nodes) and can be organized in a tree-like data structure (e.g., an array).

In some instances, processing system 1205 can receive a communication (e.g., from user device 1110) and determine one or more operations to be performed based on the received communication. For example, processing system 1205 can receive a query for allocation parameters of an access right associated with a resource. Upon receiving the query, processing system 1205 can identify a hierarchical data structure corresponding to the access right associated with the query. For example, processing system 1205 may identify that hierarchical data structure 1220 corresponds to the access right associated with the received query.

Upon determining that hierarchical data structure 1220 corresponds to the queried access right, processing system 1205 can access hierarchical data structure 1220 to determine one or more allocation parameters for the queried access right. In some instances, processing system 1205 can access a first level of hierarchical data structure 1220. For example, the first level can store the resource data corresponding to the resource associated with the queried access right. Further, processing system 1205 can access a second level of the hierarchical data structure 1220. In some instances, the second level can store various iterations of the resource. For example, an iteration of a resource can correspond to a time of availability of the resource. In this example, an iteration of a resource can be a time or time period during which users can access the resource (e.g., enter a spatial area) using allocated access rights (e.g., tickets). As a further example, a resource can be available for access over multiple time periods over multiple days, months, or years, and so on. Examples of iterations can include availability of the resource 8:00 PM to 10:00 PM on Monday through Thursday, 5:00 PM to 8:00 PM on Friday, and 2:00 PM to 5:00 PM and 7:00 PM to 9:00 PM on Saturday, and so on.

A leaf node corresponding to an iteration can store a plurality of identifiers (e.g., representations of protocols, pointers, addresses, and so on) of protocols for determining allocation parameters for that particular iteration. For example, a representation (also referred to herein as an identifier) of a protocol can include a pointer, an identifier code, an address, a link, and so on, to one or more protocols stored in protocol data store 1210. The protocols stored in protocol data store 1210 can be used to determine the allocation parameters for the queried access right. As illustrated in the example of FIG. 12, iteration #1 of hierarchical data structure 1220 shows three patterned boxes. Each patterned box can be a representation of a protocol used for determining the allocation parameter of the access right corresponding to that particular iteration. Iteration #2 of hierarchical data structure 1220 can correspond to a second iteration of the resource. Iteration #2 can store representations of protocols, as well. Some of the representations in iteration #2 can be common to the representations of iteration #1 and/or some of the representations of iteration #2 can be different from the representations of iteration #1 (e.g., specific to iteration #2). In some instances, at least one representation of each iteration of a resource object can be a placeholder for a protocol to be determined later. In this instance, the representation may be a pointer to a storage position in protocol data store 1210 that has yet to store a protocol.

In some instances, a protocol can correspond to one or more iterations of a resource. For example, if the resource has a set of iterations, a protocol can correspond to each iteration of the set of iterations. As another example, a protocol can correspond to an incomplete subset of the set of iterations. When a protocol corresponds to an incomplete subset of the set of iterations, that protocol is included in one or more iterations (as a representation, such as a pointer) of the set of iterations, and not included in one or more iterations (as a representation, such as a pointer) of the set of iterations.

Referring again to the illustration FIG. 12, processing system 1205 can retrieve the protocols associated with the representations (e.g., illustrated by the three patterned boxes) of iteration #1 by using the representations (e.g., pointers) to access the protocols in protocol data store 1210. In this case, iteration #1 of hierarchical data structure 1220 has three representations, and as such, processing system 1205 can retrieve three protocols from protocol data store 1210. In some instances, processing system 1205 can determine the allocation parameter for the queried access right by combining the three retrieved protocols associated with iteration #1. Examples of combining the protocols can include a weighted combination of outputs associated with the protocols, an average of outputs associated with the protocols, a summation or difference of the outputs associated with the protocols, and other suitable combinations. In some instances, a protocol (e.g., of a first type) can include a spatial model that includes a position for each access right. Evaluating the spatial model (discussed further herein with respect to FIG. 14) can generate an output for each position of the spatial model. The output of the position corresponding to the queried access right can be used in the combination of the protocols to determine the allocation parameter for the queried access right. In some instances, a protocol (e.g., of a second type) can include an offset value or an adjustment. As an example using FIG. 12, of the three representations (e.g., three patterned boxes) of iteration #1 of hierarchical data structure 1225, one representation can correspond to a protocol including a spatial model, one representation can correspond to a protocol including an offset value (e.g., a negative adjustment), and one representation can correspond to another offset value (e.g., a positive adjustment). The magnitude of the offset values can be determined by the protocol. In this example, the output generated by the protocol including the spatial model can be combined with the offset values of the other two protocols to generate the allocation parameter for the queried access right. Processing system 1205 can then respond to user device 1110 with the generated allocation parameter for the queried access right.

In some instances, each iteration of a resource can correspond to all of the plurality of access rights associated with a resource. For example, iteration #1 can correspond to all of the plurality of access rights associated with the resource when the resource is available during a first time period (e.g., 7 PM to 8 PM). To continue the example, iteration #2 can correspond to all of the plurality of access rights associated with the resource when the resource is available during a second time period (e.g., 9 PM to 10 PM). In some instances, an access right can correspond to a position of the spatial model included in the first protocol. In some instances, each iteration can correspond to the same plurality of access rights. In some instances, iteration #1 can correspond to a first plurality of access rights, iteration #2 can correspond to a second plurality of access rights, iteration #3 can correspond to a third plurality of access rights. In these instances, each of the first, second, and third pluralities correspond to the same set of positions of the spatial model, however, the first, second, and third pluralities correspond to different time periods of availability of the resource.

In some instances, resource access-facilitating interaction system 1200 can facilitate the modification of protocols stored in protocol data store 1210. For example, client device 1105 can transmit a communication to primary load management system 1014. Processing system 1205 can read data included in the communication and determine that the communication includes data representing a request to modify one or more protocols. For example, processing system 1205 can execute one or more operations or apply one or more rules to determine how to process the communication. Processing system 1205 can determine whether client device 1105 or an agent operating client device 1105 is authorized to access protocol data store 1210. For example, processing can execute various techniques for authentication or verification, including querying an authentication database (not shown) to determine whether credentials (e.g., login credentials) of client device 1105 match authorized credentials included in the authentication database (not shown). Upon verifying the authentication of client device 1105, processing system 1205 can grant access to protocol data store 1210 for access or modification of the stored protocols.

After authentication, client device 1105 can access the protocols stored in protocol data store 1210. In some instances, client device 1105 can modify the protocols. Examples of modifying protocols can include adjusting magnitudes of offset values, changing aspects of a spatial model (e.g., changing a function, such as a first function and a second function), adding one or more protocols, removing one or more protocols, adding a time period during which protocols are to be used in the determination of allocation parameters, adding a time period during which protocols are not to be used in the determination of allocation parameters, and other suitable modifications.

Resource access-facilitating interaction system 1200 can improve load management of queries received from client device 1105 or user device 1110 because any modifications made to protocols stored in protocol data store 1210 are automatically effective in data structures 1215. For example, hierarchical data structure 1220 includes representations (e.g., pointers) of protocols in each iteration of the resource. The representations of each iteration automatically apply the modifications in determining allocation parameters because the representation refers to the protocols, which has been modified. The storage size of data structures 1215 can be drastically reduced because only representations of the protocols are stored (not the protocols themselves). Further, all iterations that include the representation (e.g., pointer) of a modified protocol do not need to be individually accessed by client device 1105 to be modified. Processing resources are improved due to the enhanced load management and reduced storage space requirements of data structures 1215.

In some instances, resource access-facilitating interaction system 1200 can facilitate the defining of links between an iteration (e.g., a leaf node) of the hierarchical data structure and a protocol stored in protocol data store 1210. For example, as described further in FIG. 15, client device 1105 can access the primary load management system to define links between an iteration of a set of iterations of a resource and one or more protocols. Client device 1105 can select from a plurality of protocols presented on client device 1105 to determine which protocols are to be evaluated for a given iteration. In this example, client device 1105 can define one or more links (e.g., pointers) between the leaf node and the protocol data store. An identifier for each link can be stored in the leaf node (e.g., corresponding to the iteration). Evaluating the protocols linked to a given iteration can generate a result (e.g., allocation parameters for the plurality of access rights associated with that particular iteration). Further, evaluating the protocols can include combining outputs for each protocol. For example, if evaluating a first protocol outputs a value for each access right associated with a given iteration (e.g., using a spatial model), evaluating a second protocol can output a negative or positive offset for each of the outputted values (from the first protocols) for the access rights. In some instances, a protocol that outputs a negative or positive offset value can output a plurality of offset values, each having a different magnitude of offset.

Figure 13:
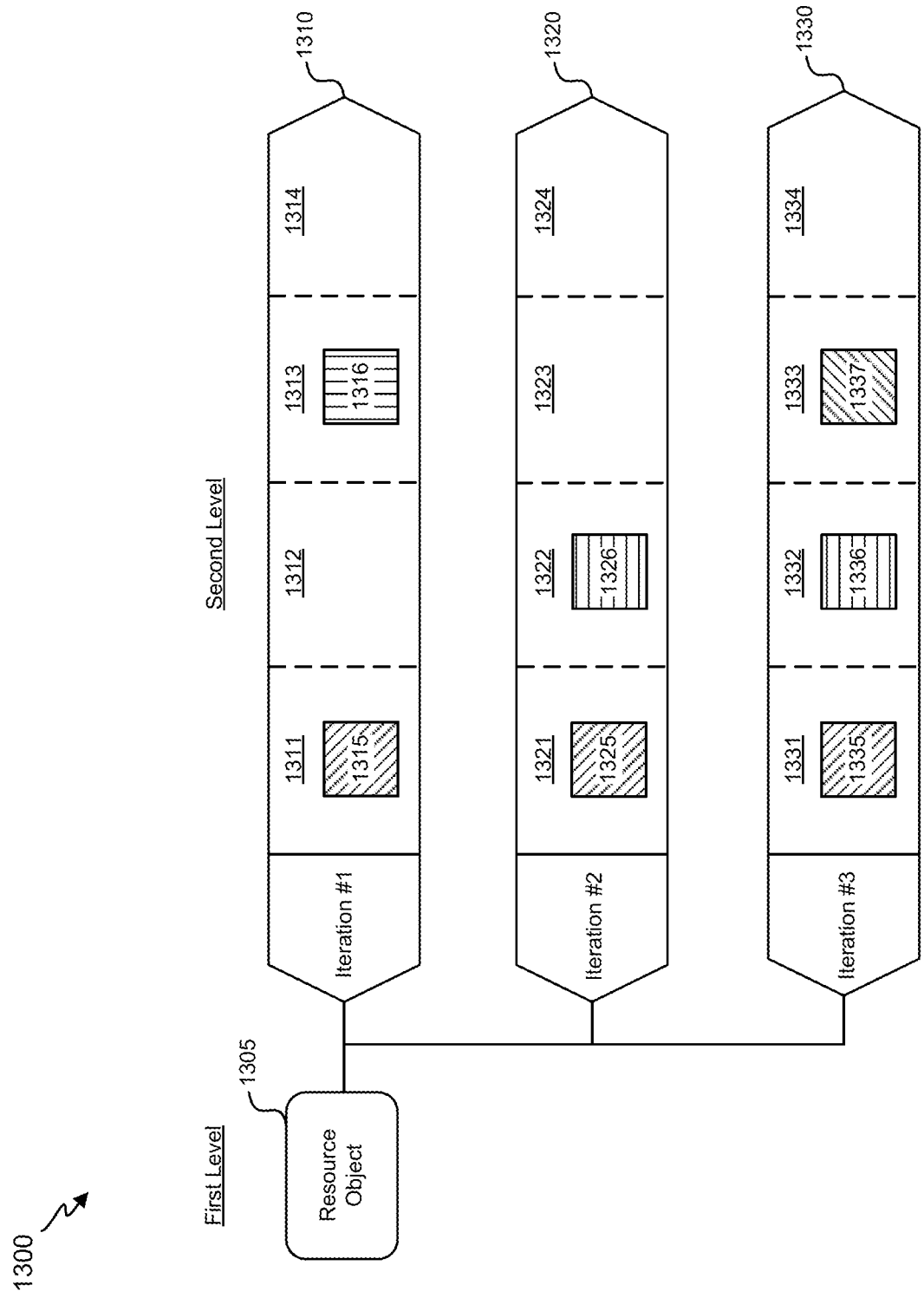
FIG. 13 illustrates an embodiment of a hierarchical data structure.

FIG. 13 illustrates an embodiment of a hierarchical data structure 1300, which can include a first level and a second level. For example, a level of hierarchical data structure 1300 can represent a node of a tree-like data structure. In this example, the first level can represent a node and the second level can represent leaf nodes of the node. It will be appreciated that hierarchical data structure 1300 can include any number of levels. Hierarchical data structure 1300 can include resource object 1305 at a first level. Resource object 1305 can correspond to a particular resource (e.g., an event) and can include resource data that represents various information about the resource. For example, resource object 1305 can include resource data that represents additional details of a resource. Examples of resource data can include a geographical location associated with the resource, one or more client's associated with the resource, one or more client devices authorized to modify the resource data, a performing entity, a number of access rights available for allocation, and other suitable data.

At a second level, hierarchical data structure 1300 can include leaf node 1310, leaf node 1320, and leaf node 1330. Each leaf node can correspond to an iteration of the resource represented by resource object 1305. For example, an iteration can correspond to a time or time period during which the resource is available to be accessed by users to which access rights have been allocated. As a further example, a resource can be available for access over multiple time periods over multiple days, months, or years, and so on. Non-limiting examples of an iteration can include availability of the resource between 8:00 PM to 10:00 PM on Monday through Thursday, 5:00 PM to 8:00 PM on Friday, and 2:00 PM to 5:00 PM and 7:00 PM to 9:00 PM on Saturday, and so on.

As illustrated in the example of FIG. 13, hierarchical data structure 1300 can include iteration #1 corresponding to leaf node 1310, iteration #2 corresponding to leaf node 1320, and iteration #3 corresponding to leaf node 1330. Leaf node 1310 can include first segment 1311, second segment 1312, third segment 1313, and one or more additional segments 1314. Leaf node 1320 can include first segment 1321, second segment 1322, third segment 1323, and one or more additional segments 1324. Leaf node 1330 can include first segment 1331, second segment 1332, third segment 1333, and one or more additional segments 1334. For example, a segment can correspond to a portion of data storage. Each segment can include a representation (e.g., a pointer) of a protocol stored in the protocol data store (e.g., protocol data store 1210). In some instances, a segment can store a representation that corresponds to a particular type of protocol. For example, the first segment can store a representation to a first type of protocol, the second segment can store a representation to a second type of protocol, and so on. It will be appreciated that a leaf node may store any number of segments.

In the example of FIG. 13, representation 1315 can be stored in first segment 1311, second segment 1312 can be empty, and representation 1316 can be stored in third segment 1313, and one or more additional segments 1314 can be empty. For example, representations 1315 and 1320 can be pointers, identifier codes, addresses, a links, and so on, to one or more protocols stored in the protocol data store. Representation 1315 can point to a first protocol stored in the protocol data store. For example, the first protocol can include a spatial model that includes a plurality of positions. Each position in the spatial model can correspond to an access right of the plurality of access rights associated with a resource. The spatial model can use a function to rank each of the plurality of positions radiating outward from a fixed first position included in the spatial model (see FIG. 14 for further discussion). The first protocol can include operations to evaluate the spatial model. For example, evaluating a spatial model can generate an output (e.g., a value, score, and so on) for each position in the spatial model. In some instances, the first protocol can be common to each iteration included in the second level of hierarchical data structure 1300. In this example, representations 1315, 1325, and 1335 can each point to the same first protocol.

It will be appreciated that some embodiments can use a spatial model that uses a peak shape function to rank positions outward from a selected first fixed position, e.g., a Lorentzian function, a Gaussian function, and/or other similar approaches. One having skill in the relevant art(s), given the description herein will appreciate that other types of models can be used by embodiments.

Representation 1316 can point to a second protocol stored in the protocol data store. For example, the second protocol can be a negative offset value. In this example, the second protocol can be specific to the first iteration (whereas the first protocol is common to each iteration). In some instances, the processing system (e.g., processing system 1205) can receive a query for an access right. The processing system can identify which resource corresponds to the queried access right by reading information included in the query for the access right. Further, upon determining the resource corresponding to the queried access right, the processing system can also determine to which iteration of the resource the queried access right corresponds. For example, a queried access right can correspond to an iteration (e.g., a time period of availability of access) of a Monday between 5:00 PM and 7:00 PM.

In some instances, the processing system can determine that the allocation parameter for the queried access right is a combination of the first protocol and the second protocol. For example, the allocation parameter can be generated by identifying the output of the spatial model for the position corresponding to the queried access right (e.g., by using the first protocol) and by summing the output with the negative offset value (e.g., by using the second protocol). If the queried access right corresponds to iteration #2, then the allocation parameter would be determined using representation 1325 (e.g., the first protocol) and representation 1326 (e.g., a third protocol). In this example, the allocation parameter for the queried access right would be determined by identifying the output of the position corresponding to the access right using the spatial model of the first protocol, and combining the output with the third protocol (e.g., a positive offset value). In this example, the allocation parameter can be a summation of the output of the spatial model corresponding to the queried access right and the positive offset value of the third protocol.

If the queried access right corresponds to iteration #3, then the allocation parameter would be determined using representation 1335 (e.g., the first protocol), representation 1336 (e.g., the third protocol), and representation 1337 (e.g., a fourth protocol). As a non-limiting example, the fourth protocol can be a negative offset value with a greater magnitude than the second protocol associated with representation 1316. The allocation parameter for the queried access right may be determined by combining the output of the position corresponding to the access right using the spatial model of the first protocol, the positive offset value of the third protocol, and the negative offset value of the fourth protocol. For example, the allocation parameter can be a summation of the output of the spatial model corresponding to the queried access right, the positive offset value of the third protocol, and the negative offset value of the fourth protocol. It will be appreciated that the allocation parameter can also be determined using the resource data in combination with the identified protocols. For example, the resource data may include a common parameter or variable to be applied to the combination of protocols.

In some instances, representations stored in the first segment (e.g., first segments 1311, 1321, 1331) of a leaf node (e.g., leaf nodes 1310, 1320, 1330) can be representations corresponding to protocols of a first type. Further, protocols of a first type can be common to all iterations in a hierarchical data structure. For example, representations 1315, 1325, and 1335 can each point to the same protocol. In other instances, protocols of a first type can be specific to an iteration. For example, protocols of a first type can include spatial models that generate outputs for a plurality of positions, such that each position corresponds to an access right associated with a resource. Further, protocols of a first type can characterize an attribute of a queried access right or of an iteration of a resource. It will be appreciated that a segment can store any number of representations.

Representations stored in the second segment (e.g., second segments 1312, 1322, 1332) of a leaf node (e.g., leaf nodes 1310, 1320, 1330) can be representations corresponding to protocols of a second type. In some instances, protocols of a second type can be specific to the iteration corresponding to the leaf node in which the segment is stored. For example, protocols of a second type can include an offset value (e.g., positive or negative offset). In FIG. 13, representations 1326 and 1336 can correspond to the same protocol (e.g., a negative offset). For example, a negative offset can offset the output generated by a protocol including a spatial model.

Representations stored in the third segment (e.g., third segments 1313, 1323, 1333) of a leaf node (e.g., leaf nodes 1310, 1320, 1330) can be representations corresponding to protocols of a third type. In some instances, protocols of a third type can be protocols that retrieve additional information (e.g., stored in local or remote servers) related to the queried access right. For example, representation 1316 can correspond to a protocol that accesses a database storing additional information (e.g., coupons, discounts for other resources, and so on) relating to the access right and/or the resource. This additional information can be included in the response communication to the user device that originally queried the access right. It will be appreciated that protocols can be of any number of types.

In some instances, protocols of a third type can correspond to offset values. For example, offset values can be positive, negative, and so on. In this example, representations 1316 and 1337 can correspond to the same protocol (e.g., a negative offset value). However, in this example, while representations 1316 and 1337 can correspond to the same type of protocol, representation 1316 can correspond to a different protocol than representation 1337. For example, the protocols corresponding to representations 1316 and 1337 can each correspond to a negative offset value, however, the negative offset value corresponding to representation 1316 can have a higher magnitude than the negative offset value corresponding to representation 1337.

Figure 14:
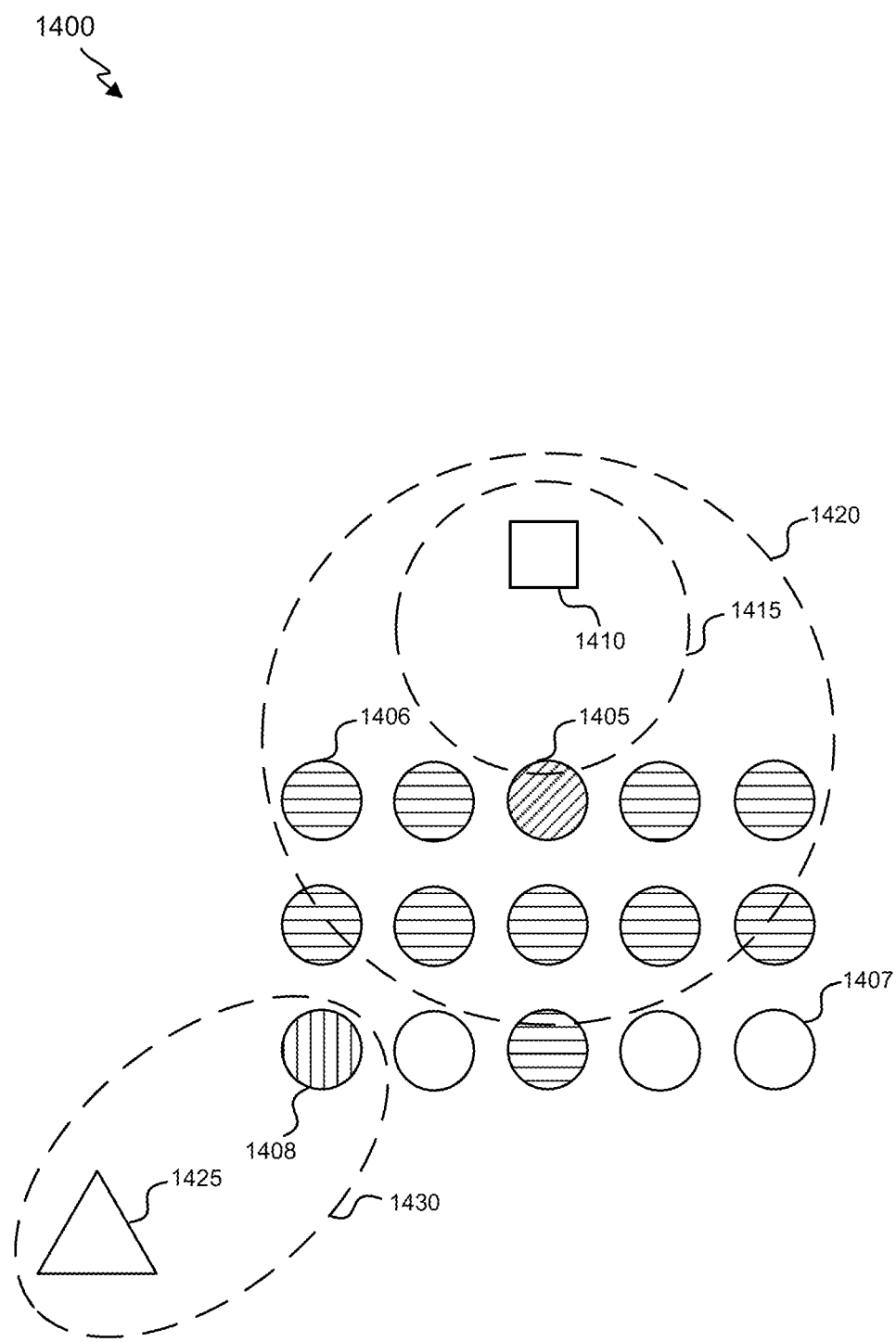
FIG. 14 illustrates an embodiment of a protocol for assigning priority metrics to various positions of a spatial model.

FIG. 14 illustrates an embodiment of a protocol for assigning priority metrics to various positions of a spatial model. For example, the embodiment of FIG. 14 can correspond to the first protocol described with reference to FIG. 13. While a spatial model as described above can include any number of fixed positions, spatial model 1400, for example, can include a first fixed position 1410 and a second fixed position 1425. In addition, spatial model 1400 can also include various positions (e.g., representing seats in a venue). The various positions can include positions 1405, 1406, 1407, 1408, and other positions. In some instances, an access right can correspond to a position in the spatial model. For example, positions 1405 through 1408 can correspond to four different access rights associated with the same resource.

In some instances, a priority metric can be assigned to a position based on the spatial model. The priority metric can enable allocations of the access right corresponding to the position. For example, a priority metric can be an output generated for each position in the spatial mode. In this example, the output generated for a position by evaluating the spatial model (e.g., the output as described in FIG. 13) can be a value associated with the priority metric. Further, in some instances, the spatial model can use a first function to rank the various priority metrics for positions radiating out from first fixed position 1410, and a second function to rank the various positions radiating out from second fixed position 1425. In some instances, the priority metric for a given position can be the result of the first function for that position combined with the result of the second function for that position. It will be appreciated that some embodiments can use a spatial model that uses a peak shape function to rank positions outward from first fixed position 1410, e.g., a Lorentzian function, a Gaussian function, and/or other similar approaches. As used herein, first fixed position 1410 can represent a desirable position, whereas, second fixed position 1425 can represent an undesirable position. One having skill in the relevant art(s), given the description herein will appreciate that other types of models can be used by embodiments.

In the example illustrated in FIG. 14, a first function can include several ranges radiating out of first fixed position 1410. For example, the first function can include first range 1415 and second range 1420. It will be appreciated that any number of ranges can be present in the first function. If at least of portion of a position is within first range 1415, it can be assigned a first priority metric. For example, position 1405 is included within first range 1415, and accordingly, position 1405 can be assigned the first priority metric, or a version thereof. Further, if at least a portion of a position is within second range 1420, it can be assigned a second priority metric. For example, position 1406 is included in second range 1420, and accordingly, position 1406 can be assigned the second priority metric. In this example, the first priority metric can indicate that a higher priority is assigned to position 1405 than position 1406. The first priority metric can also indicate that the access right associated with position 1405 has a higher priority than the access right associated with position 1406. As a non-limiting example, the output generated for position 1405 can be higher than the output generated for position 1406, and as a result, the allocation parameter ultimately determined for the access right corresponding to position 1405 can be higher than the allocation parameter for the access right corresponding to position 1406.

In addition, a second function can include one or more ranges radiating out of second fixed position 1425. For example, the second function can include third range 1430. It will be appreciated that any number of ranges can be present in the second function. If a position is included in third range 1430, it can be assigned a third priority metric. For example, the third priority metric can indicate a priority lower than both the first priority metric and the second priority metric. In some instances, after the first and second fixed positions are set (e.g., by an agent operating client device 1105), the spatial model is used to process the positions to generate a real number result for each access right corresponding to a position in the spatial model. This result can be an assessment of the value of an access right (e.g., an allocation parameter of an access right) based on the spatial proximity of the position to the first and/or second fixed positions.

Figure 15:
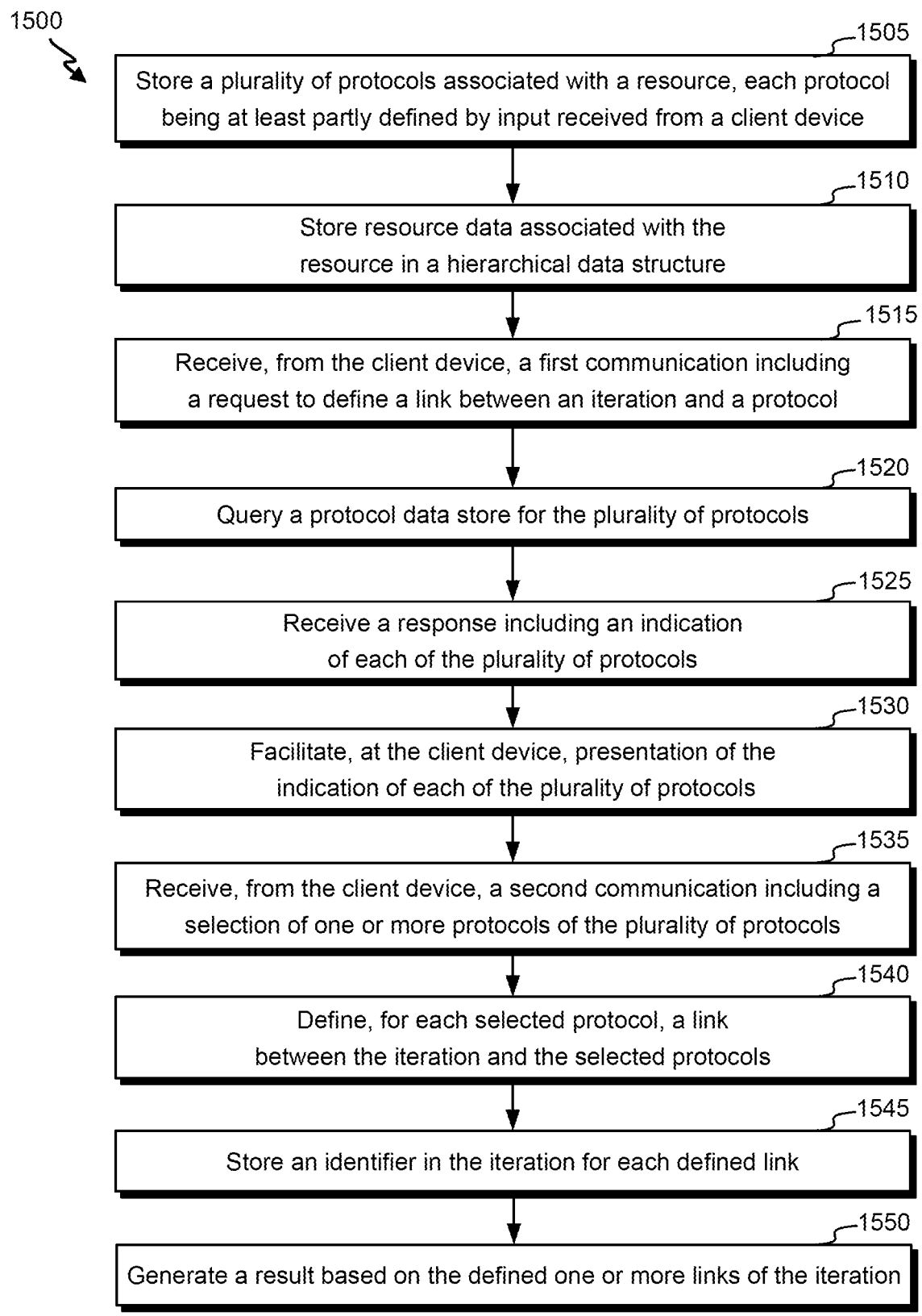
FIG. 15 is a flowchart of an embodiment of a process for enhancing load processing using hierarchical data structures.

Referring next to FIG. 15 is a flowchart of an embodiment of process 1500 for enhancing load processing using linked hierarchical data structures. Process 1500 can be performed (for example), in part or in its entirety at a primary load management system, primary assignment management system, and/or a processing system (e.g., processing system 1205). Process 1500 begins at block 1505 where a plurality of protocols associated with a resource are stored. For example, the plurality of protocols can be stored in a protocol data store (e.g., protocol data store 1210). The protocol data store can store protocols associated with various resources. In some instances, each protocol of the plurality of protocols can be at least partly defined using various inputs received from a client device (e.g., client device 1105). For example, a client device (operated by an agent of the client) can access the primary load management system to define the protocols or a parameter of the protocol associated with a particular resource. As another example, an agent of the client can define a magnitude of a negative offset value of the protocol. Further, the resource can correspond to a plurality of access rights for allocation to user devices. For example, the resource can corresponding to multiple access rights that are to be allocated to various user devices, or which a portion at least has been previously allocated to one or more user devices.

At block 1510, resource data associated with the resource can be stored in a hierarchical data structure. For example, resource data can include all data associated with a resource, such as, a resource object, a set of iterations of the resource associated with the resource object, and other suitable information. The hierarchical data structure can include a plurality of levels. For example, a level can correspond to various nodes of a tree-like data structure. A first level can correspond to a first node of a tree-like data structure, a second level can correspond to a leaf node of the first node in the tree-like data structure, and so on. In some instances, the hierarchical data structure can store a resource object at a first level. For example, a resource object can include data representing the resource (e.g., geographical location of availability of the resource, a performing entity, general conditions associated with access to the resource, and so on). In addition, as an example, the hierarchical data structure can store a set of iterations of the resource at a second level (e.g., each iteration can be stored in a separate leaf node of the resource object). Each iteration of the set of iterations can correspond to a different time associated with availability of the resource. Further, each iteration of the set of iterations can be linked to one or more protocols stored in the protocol data store. For example, linking an iteration to a protocol can be achieved by storing an identifier (e.g., a pointer indicating an address of a protocol stored in the protocol data store) in the iteration (e.g., in the leaf node corresponding to the iteration).

In some instances, a protocol stored in the protocol data store can correspond to one or more iterations associated with a resource. For example, if there is a set of iterations associated with a resource, a protocol can be linked to each of the iterations in the set of iterations. Linking each iteration to a protocol can including storing a pointer pointing to the protocol in each iteration (e.g., each leaf node). As another example, a protocol can be linked to an incomplete subset of the set of iterations. In this example, the protocol can be linked to one or more iterations of the set of iterations, and not linked to one or more iterations in the same set of iterations. In some instances, since multiple hierarchical data structures can be stored for various resources, the hierarchical data structure associated with the resource can be identified by comparing data included in the communications received from the client device with the resource data included in the hierarchical data structure. If the data included in communications matches or corresponds to the resource data, then the hierarchical data structure storing that resource data can be identified.

At block 1515, a first communication can be received from a client device. For example, the first communication can be received at one or more network interfaces of the primary load management system. In some instances, the first communication can include request data that represents a request to define a link between an iteration of the set of iterations and a protocol stored in the protocol data store. For example, a first iteration can correspond to any single iteration of the set of iterations. In this example, the first communication (e.g., transmitted by the client device) can include data identifying one or more iterations of the set of iterations for which a link is to be defined. In other examples, the first communication can request access to the hierarchical data structure or the protocol data store. In these examples, the client device, after authentication is verified, can access the protocol data store to define one or more protocols. Defining the one or more protocols can include creating protocols, deleting existing protocols, or modifying existing protocols.

In some instances, an iteration can be represented by a leaf node of the hierarchical data structure. In these instances, the leaf node representing the iteration can store identifiers (e.g., pointers) linking to various protocols stored in the protocol data store. Identifying a protocol can include following the pointer (e.g., the identifier) stored in the leaf node to the protocol data store, which stores the protocols. For example, the identifier can be an address or a representation of the address of the protocol stored in the protocol data store.

At block 1520, the protocol data store can be queried for retrieval of the plurality of protocols associated with the resource. In some instances, the querying of block 1520 can be automatically performed in response to receiving the communication from the client device. In some instances, the querying of block 1520 can be performed upon receiving an input from the client device indicating a request to retrieve the plurality of protocols from the protocol data store. Further, querying the protocol data store can include transmitting a request for information (e.g., by the processing system) to the protocol data store. At block 1525, the protocol data store can return a response to the query. For example, the response returned by the protocol data store can include an indication of each of the plurality of protocols that correspond to the resource. In this example, the query can include an identifier of the resource, and the protocol data store can use a lookup table to identify all of the protocols that correspond to the identifier of the resource. Examples of an indication of each of the plurality of protocols can include a code that uniquely identifies each of the protocols, a visual representation of each of the protocols (e.g., a thumbnail image), an item of a list of protocols, a text representation of the protocols, and so on.

At block 1530, presentation of the indication of each of the plurality of protocols associated with the resource can be facilitated at the client device. For example, the primary load management system can transmit data to the client device, such that when the data is received at the client device, the data causes the presentation of each of the plurality of protocols to be displayed on a screen of the client device. In some instances, when the indication of each of the protocols is displayed on the screen of the client device, each protocol can be selectable by inputs received at the client device. For example, a client device can display a list of each of the plurality of protocols, such that each item on the list is selectable. In this example, the agent operating the client device can select (e.g., using drag and drop, using mouse clicks, and so on) one or more of the listed protocols to be linked to the iteration. At block 1535, a second communication can be received at the primary load management system from the client device. For example, the second communication can include the one or more protocols selected from the presented indications of each of the plurality of protocols (e.g., based on inputs received at the client device).

At block 1540, for each of the protocols selected at the client device at block 1535, a link can be defined between the iteration and the selected protocol. For example, if a first protocol and a second protocol were selected (at block 1535) from amongst the plurality of protocols presented at the client device, then a first link would be defined linking the iteration (e.g., the first iteration) to the storage location of the first protocol in the protocol data store, and a second link would also be defined linking the iteration (e.g., the first iteration) to the storage location of the second protocol in the protocol data store. In this example, defining a link can include linking the leaf node corresponding the iteration to a location in the protocol data store. At block 1545, an identifier for each defined link can be stored in the leaf node corresponding to the iteration. For example, if a leaf node has two segments and has two defined links, a first identifier linking to a first protocol can be stored in the first segment and a second identifier linking to the second protocol can be stored in the second segment. For example, an identifier of a defined link can be a pointer including an address (or a code representing an address) that points to a storage location in the protocol data store.

In some instance, an identifier can be determined for each of the selected one or more selected protocols. For example, an identifier can include a pointer pointing to an address of the location where the selected protocol is stored in the protocol data store. An identifier (e.g., pointer) can be determined or generated for each of the selected one or more selected protocols. For example, if a first iteration corresponds to a leaf node of the hierarchical data structure, the identifier (e.g., pointers) for each of the selected protocols can be stored in the leaf node. In some instances, as discussed in FIG. 13, the leaf node can be segmented into a plurality of segments. In these instances, one or more identifiers of the selected protocols can be stored in each segment. In some instances, each segment may store an identifier (corresponding to a protocol) of a particular type. For example, a first segment in the leaf node can store identifiers linking to protocols of a first type, and a second segment in the leaf node can store identifiers linking to protocols of a second type. In some instances, the different segments can be the same across each iteration (e.g., leaf node) in the set of iterations stored in the hierarchical data structure. In other instances, segments (e.g., size, or type of identifier stored) can be difference across each iteration in the set of iterations.

It will be appreciated that the protocols linked to a certain iteration (e.g., a leaf node representing the iteration) can have a hierarchy. For example, an iteration can be linked to a first protocol and a second protocol. When evaluated, the first protocol and the second protocol may be in conflict. For example, a first protocol may generate a plurality of outputs of different magnitudes (e.g., values of different magnitudes), but a second protocol may require that all outputs have the same value (e.g., when all access rights of the resource should have the same allocation parameter). In this example, there may be a conflict between the first and second protocols. Further, the second protocol may have a higher priority (e.g., be higher in the hierarchy) than the first protocol, such that the second protocol is controlling when a conflict between two or more protocols exists. In this example, if the second protocol is higher in the hierarchy, the output of the second protocol (when evaluated) will control over the output of the first protocol (when evaluated).

At block 1550, a result can be generated based on the defined one or more links of an iteration. In some instances, generating the result can include, for each defined link, identifying the protocol linked to the iteration. Further, generating the result can include evaluating the linked protocols to generate one or more outputs for each linked protocol. For example, when evaluating protocols linked to a given iteration (e.g., leaf node), the output of each evaluated protocol can be combined to determine the allocation parameter(s) for one or more access rights of the plurality of access rights (e.g., a group of access rights of the plurality of access rights, each access right of the plurality, and so on) associated with the resource. In some instances, generating a result can including displaying various information associated with access rights of plurality of access rights. For example, the allocation parameter determined for each access right can be displayed (e.g., on a map having a position for each access right).

It will be appreciated that the client device can access the primary load management system to modify a defined protocol stored in the protocol data store. For example, the client device can transmit a communication including a request to modify one or more protocols of the plurality of protocols. Examples of modifying a protocol can include adding a protocol, removing a protocol, changing a parameter or aspect of a defined protocol. Upon modifying the protocol, the primary load management system can automatically generate an updated result based on the modified protocols. For example, an allocation parameter or one or more access rights can be automatically updated when a protocol is modified or redefined. Advantageously, modifying a protocol is automatically reflected in the identifiers stored in the hierarchical data structure because the hierarchical data structure stores identifiers (e.g., pointers) of protocols and not the protocols itself. Accordingly, the identifier would already be pointing to the modified protocol, and as such, loads (e.g., requests from user devices for allocation of an access right) can be processed efficiently.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A primary load management system for enhanced load processing using hierarchical data structures, comprising:
    one or more network interfaces configured to establish connections to one or more networks;
    one or more data processors coupled to the one or more network interfaces to process communications received at the one or more network interfaces;
    a protocol data store to store a plurality of protocols associated with a resource, each protocol of the plurality of protocols being at least partly defined by input received from a client device, and the resource corresponding to a plurality of access rights for allocation to user devices;
    a hierarchical data structure coupled to the protocol data store, wherein the hierarchical data structure storing a set of iterations of the resource, each iteration of the set of iterations corresponding to a different time associated with availability of the resource, each iteration corresponds to a leaf node of the hierarchical data structure, and a plurality of leaf nodes stores pointers to storage locations of the protocol data store, which stores the plurality of protocols associated with the resource; and
    a non-transitory computer-readable storage medium containing instructions which, when executed on the one or more data processors, cause the one or more data processors to perform operations including:
    receiving, at the one or more network interfaces, a first communication from the client device, the first communication including a request to define a link between an iteration of the set of iterations and a protocol stored in the protocol data store;
    querying the protocol data store for the plurality of protocols associated with the resource by following the pointers stored in the leaf node to the protocol data store, which stores the plurality of protocols;
    receiving a response from the protocol data store, the response including a representation of each of the plurality of protocols; and
    facilitating, at the client device, presentation of the representation of each of the plurality of protocols.

2. The primary load management system for enhanced load processing using hierarchical data structures, as recited in claim 1, further comprising:
    receiving a second communication from the client device, the second communication including a selection of one or more protocols from the plurality of protocols;
    defining a link between the iteration and each of the selected one or more protocols; and
    generating a result based on the defined one or more links stored in the iteration.

3. The primary load management system for enhanced load processing using hierarchical data structures, as recited in claim 1, a protocol includes a workflow, decision tree, or series of operations for determining an allocation parameter of an access right.

4. The primary load management system for enhanced load processing using hierarchical data structures, as recited in claim 1, wherein generating the result based on the defined one or more links stored in the iteration comprises:
    identifying a first protocol corresponding to a first defined link of the iteration;
    identifying a second protocol corresponding to a second defined link of the iteration;
    evaluating the first protocol, evaluation of the first protocol including generating one or more first outputs;
    evaluating the second protocol, evaluation of the second protocol including generating one or more second outputs;
    determining a combination of the one or more first outputs and the one or more second outputs; and
    generating an allocation parameter for each of one or more access rights of the plurality of access rights, the generation of the allocation parameter being based on the determined combination.

5. The primary load management system for enhanced load processing using hierarchical data structures, as recited in claim 1, wherein:
the defined one or more links includes a first defined link linking to a first protocol of the plurality of protocols and a second defined link linking to a second protocol of the plurality of protocols,
the first protocol is of a first type of protocol, the first type of protocol characterizing a first attribute of each iteration of the set of iterations, and
the second protocol is of a second type of protocol, the second type of protocol characterizing a second attribute of the iteration.

6. The primary load management system for enhanced load processing using hierarchical data structures, as recited in claim 1, wherein the first defined link links to a first protocol, the first protocol including a workflow for assigning priority metrics to one or more positions of a spatial model, each position of the one or more positions corresponding to an access right of the plurality of access rights associated with the resource.

7. The primary load management system for enhanced load processing using hierarchical data structures, as recited in claim 6, further comprising:
identifying, using the spatial model, a first fixed position and a second fixed position, the first fixed position being associated with a first function, and the second fixed position being associated with a second function;
generating a parameter for each position in the spatial model based on the first function and the second function; and
generating an allocation parameter for each access right of the plurality of access rights associated with the resource, the generation of the allocation parameter being based on the generated parameter for a position associated with the access right.

8. The primary load management system for enhanced load processing using hierarchical data structures, as recited in claim 7, wherein generating the parameter comprises:
evaluating the spatial model to generate a plurality of outputs, each output of the plurality of outputs corresponding to a position of the plurality of positions; and
determining a priority metric for the position based on the corresponding output.

9. The primary load management system for enhanced load processing using hierarchical data structures, as recited in claim 1, wherein the defined one or more links includes a hierarchy of links, such that a first protocol of a first defined link is controlling when the first protocol conflicts with a second protocol of a second defined link of the defined one or more links.

10. A computer-implemented method for enhanced load processing using hierarchical data structures, comprising:
storing a plurality of protocols associated with a resource, each protocol of the plurality of protocols being at least partly defined by input received from a client device, and the resource corresponding to a plurality of access rights for allocation to user devices;
storing resource data associated with the resource in a hierarchical data structure coupled to a protocol data store, wherein the resource data including a set of iterations of the resource, each iteration of the set of iterations corresponding to a different time associated with availability of the resource, each iteration corresponds to a leaf node of the hierarchical data structure, and a plurality of leaf nodes stores pointers to storage locations of the protocol data store, which stores the plurality of protocols associated with the resource;
receiving a first communication from the client device, the first communication including a request to define a link between an iteration of the set of iterations and a protocol of the plurality of protocols;
querying for the plurality of protocols associated with the resource by following the pointers stored in the leaf node to the protocol data store, which stores the plurality of protocols;
receiving a response from the protocol data store, the response including a representation of each of the plurality of protocols; and
facilitating, at the client device, presentation of the representation of each of the plurality of protocols.

11. The computer-implemented method for enhanced load processing using hierarchical data structures, as recited in claim 10, wherein generating the result based on the defined one or more links stored in the iteration comprises:
identifying a first protocol corresponding to a first defined link of the iteration;
identifying a second protocol corresponding to a second defined link of the iteration;
evaluating the first protocol, evaluation of the first protocol including generating one or more first outputs;
evaluating the second protocol, evaluation of the second protocol including generating one or more second outputs;
determining a combination of the one or more first outputs and the one or more second outputs; and
generating an allocation parameter for each of one or more access rights of the plurality of access rights, the generation of the allocation parameter being based on the determined combination.

12. The computer-implemented method for enhanced load processing using hierarchical data structures, as recited in claim 10, wherein:
the defined one or more links includes a first defined link linking to a first protocol of the plurality of protocols and a second defined link linking to a second protocol of the plurality of protocols,
the first protocol is of a first type of protocol, the first type of protocol characterizing a first attribute of each iteration of the set of iterations, and
the second protocol is of a second type of protocol, the second type of protocol characterizing a second attribute of the iteration.

13. The computer-implemented method for enhanced load processing using hierarchical data structures, as recited in claim 12, wherein the first defined link links to a first protocol, the first protocol including a workflow for assigning priority metrics to one or more positions of a spatial model, each position of the one or more positions corresponding to an access right of the plurality of access rights associated with the resource.

14. The computer-implemented method for enhanced load processing using hierarchical data structures, as recited in claim 11, further comprising:
identifying, using the spatial model, a first fixed position and a second fixed position, the first fixed position being associated with a first function, and the second fixed position being associated with a second function;
generating a parameter for each position in the spatial model based on the first function and the second function; and
generating an allocation parameter for each access right of the plurality of access rights associated with the resource, the generation of the allocation parameter being based on the generated parameter for a position associated with the access right.

15. The computer-implemented method for enhanced load processing using hierarchical data structures, as recited in claim 14, wherein generating the parameter comprises:
   evaluating the spatial model to generate a plurality of outputs, each output of the plurality of outputs corresponding to a position of the plurality of positions; and
   determining a priority metric for the position based on the corresponding output.

16. The computer-implemented method for enhanced load processing using hierarchical data structures, as recited in claim 10, wherein the defined one or more links includes a hierarchy of links, such that a first protocol of a first defined link is controlling when the first protocol conflicts with a second protocol of a second defined link of the defined one or more links.

17. A computer-program product tangibly embodied in a non-transitory machine-readable storage medium, including instructions configured to cause a data processing apparatus to perform operations including:
   storing a plurality of protocols associated with a resource, each protocol of the plurality of protocols being at least partly defined by input received from a client device, and the resource corresponding to a plurality of access rights for allocation to user devices;
   storing resource data associated with the resource in a hierarchical data structure coupled to a protocol data store, wherein the resource data including a set of iterations of the resource, each iteration of the set of iterations corresponding to a different time associated with availability of the resource, each iteration corresponds to a leaf node of the hierarchical data structure, and a plurality of leaf nodes stores pointers to storage locations of the protocol data store, which stores the plurality of protocols associated with the resource;
   receiving a first communication from the client device, the first communication including a request to define a link between an iteration of the set of iterations and a protocol of the plurality of protocols;
   querying for the plurality of protocols associated with the resource by following the pointers stored in the leaf node to the protocol data store, which stores the plurality of protocols;
   receiving a response from the protocol data store, the response including an indication of each of the plurality of protocols; and
   facilitating, at the client device, presentation of the indication of each of the plurality of protocols.

18. The computer-program product, as recited in claim 17, wherein generating the result based on the defined one or more links stored in the iteration comprises:
   identifying a first protocol corresponding to a first defined link of the iteration;
   identifying a second protocol corresponding to a second defined link of the iteration;
   evaluating the first protocol, evaluation of the first protocol including generating one or more first outputs;
   evaluating the second protocol, evaluation of the second protocol including generating one or more second outputs;
   determining a combination of the one or more first outputs and the one or more second outputs; and
   generating an allocation parameter for each of one or more access rights of the plurality of access rights, the generation of the allocation parameter being based on the determined combination.

19. The computer-program product, as recited in claim 17, wherein:
   the defined one or more links includes a first defined link linking to a first protocol of the plurality of protocols and a second defined link linking to a second protocol of the plurality of protocols,
   the first protocol is of a first type of protocol, the first type of protocol characterizing a first attribute of each iteration of the set of iterations, and
   the second protocol is of a second type of protocol, the second type of protocol characterizing a second attribute of the iteration.

20. The computer-program product, as recited in claim 17, wherein the first defined link links to a first protocol, the first protocol including a workflow for assigning priority metrics to one or more positions of a spatial model, each position of the one or more positions corresponding to an access right of the plurality of access rights associated with the resource.

* * * * *